United States Patent [19]

Silberman

[11] Patent Number: 5,152,370

[45] Date of Patent: Oct. 6, 1992

[54] BRIDGE DOCKING STRUCTURE FOR AIRCRAFT

[76] Inventor: Cyril J. Silberman, 3840 Lakeland Ave. N., Minneapolis, Minn. 55422

[21] Appl. No.: 640,982

[22] Filed: Jan. 14, 1991

[51] Int. Cl.$^5$ .................. E04G 1/00; E04G 3/14; E06C 7/16; E01D 1/00
[52] U.S. Cl. .................. 182/130; 14/69.5; 182/141; 182/136; 182/36; 182/117
[58] Field of Search ............... 182/130, 131, 132, 141, 182/36, 117; 14/69.5

[56] References Cited

U.S. PATENT DOCUMENTS

| | | |
|---|---|---|
| 1,718,979 | 7/1929 | Protzeller . |
| 2,406,786 | 8/1945 | Aukland ............... 182/131 |
| 2,430,179 | 11/1947 | Lanchester ............ 182/131 |
| 2,829,582 | 4/1958 | Abbott et al. . |
| 2,978,754 | 4/1961 | Wilson ................ 182/131 |
| 3,256,955 | 6/1966 | Izmirian et al. . |
| 3,451,504 | 6/1969 | Logan . |
| 3,602,335 | 8/1971 | Gustetic . |
| 3,670,849 | 6/1972 | Milner, Jr. ............ 182/19 |
| 3,785,454 | 1/1974 | Behunin et al. . |
| 3,814,211 | 6/1974 | Pamer . |
| 3,831,709 | 8/1974 | Stanford et al. . |
| 3,927,732 | 12/1975 | Ooka et al. . |
| 4,060,148 | 11/1977 | Sidney ............... 182/117 X |
| 4,087,977 | 5/1978 | Kuhlman . |
| 4,154,318 | 5/1979 | Malleone . |
| 4,168,814 | 9/1979 | Bird . |
| 4,236,698 | 12/1980 | Compte . |
| 4,273,214 | 6/1981 | Grove . |
| 4,373,761 | 2/1983 | Hansberry, Jr. ........ 182/132 X |
| 4,646,877 | 3/1987 | Whan ................. 182/129 X |
| 4,657,111 | 4/1987 | Tremblay . |
| 4,759,437 | 7/1988 | Bevins . |
| 4,887,107 | 10/1989 | Anderson . |

FOREIGN PATENT DOCUMENTS

| | | |
|---|---|---|
| 2604141 | 8/1977 | Fed. Rep. of Germany . |
| 2737418 | 1/1979 | Fed. Rep. of Germany . |
| 476205 | 12/1975 | U.S.S.R. . |
| 521354 | 5/1940 | United Kingdom . |

Primary Examiner—Ramon S. Britts
Assistant Examiner—Nancy P. Connolly
Attorney, Agent, or Firm—Woodcock Washburn Kurtz Mackiewicz & Norris

[57] ABSTRACT

A system for servicing and maintaining an aircraft includes a fuselage dock assembly having a first ground-supported column, a second ground-supported column and a walkway section supported by the first and second columns. The system also includes a tail dock assembly having a recess defined therein for receiving a tail section of an aircraft, and an engine stand for servicing an engine of the aircraft that is not readily accessible from the fuselage dock assembly or the tail dock assembly. Structure is also provided for adjusting the height and inclination of the walkway section relative to a horizontal plane, so that the walkway section will conform to the natural inclination of a particular aircraft. The system includes serveral other novel and advantageous features for increasing the safety and efficiency of aircraft maintenance.

17 Claims, 20 Drawing Sheets

FIG. IA
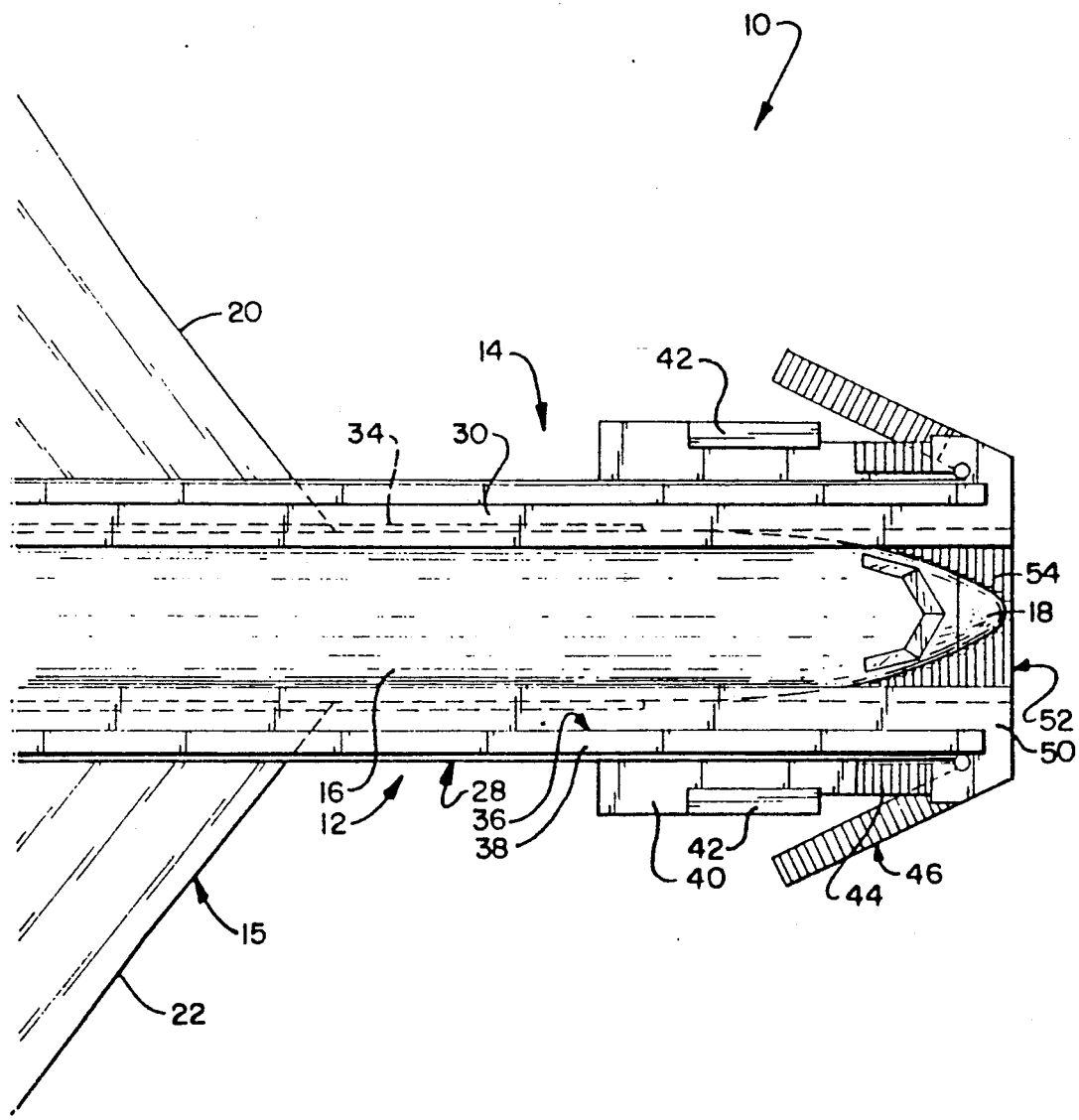

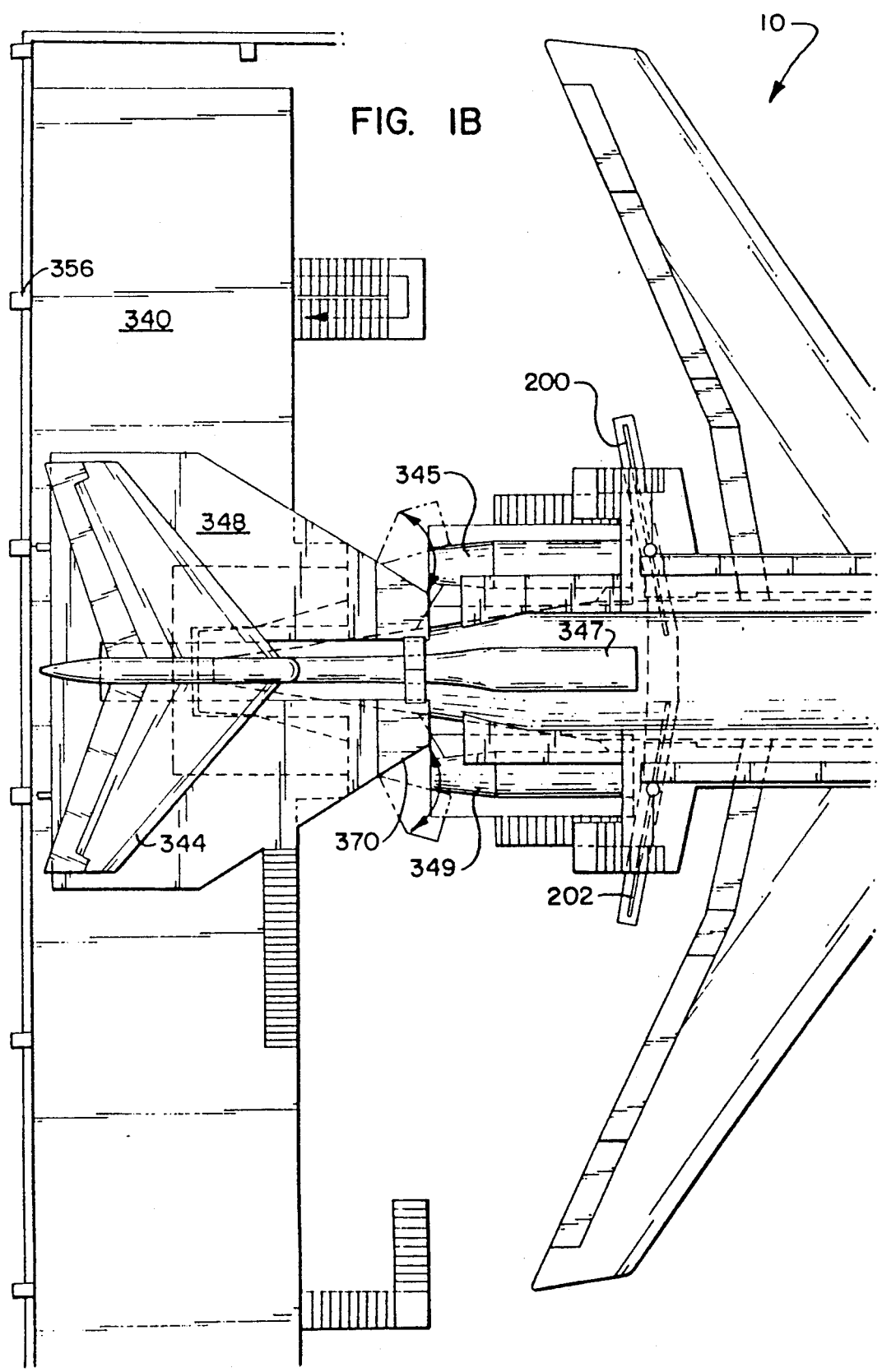

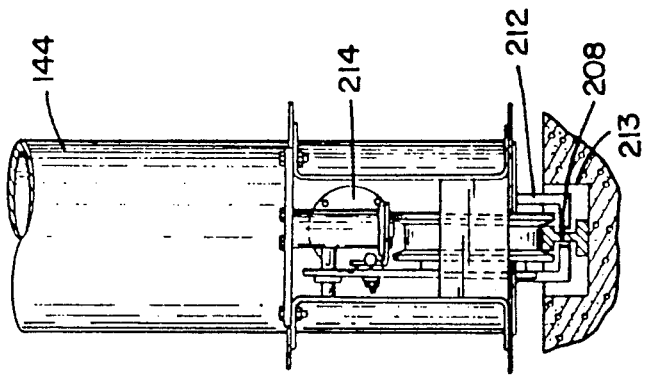
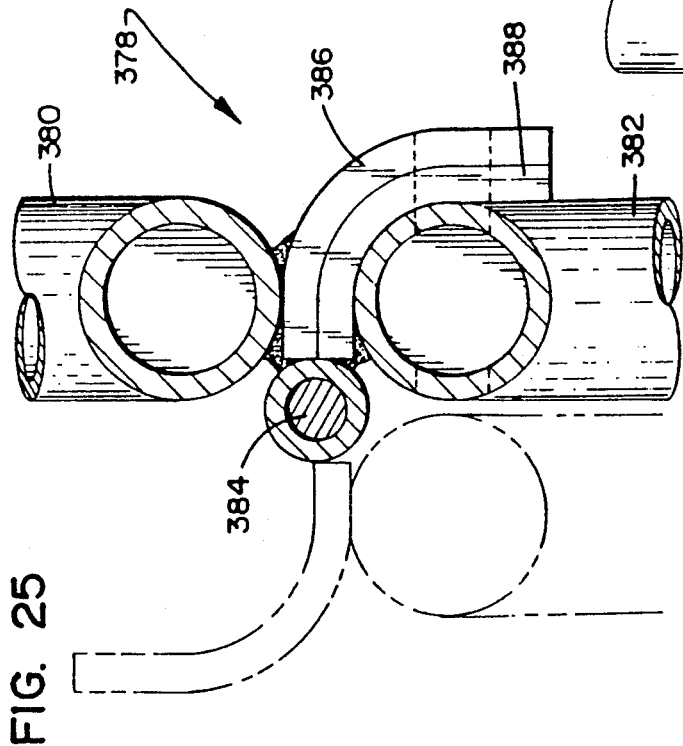
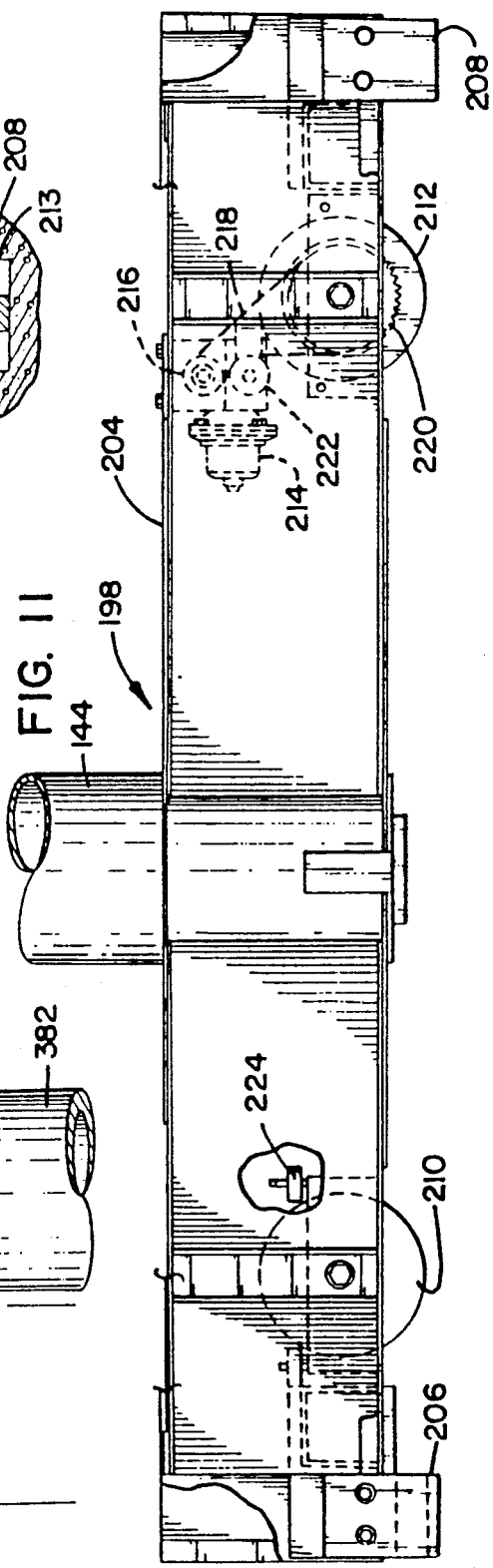
FIG. 10
FIG. 11
FIG. 25

FIG. 26A
FIG. 26B
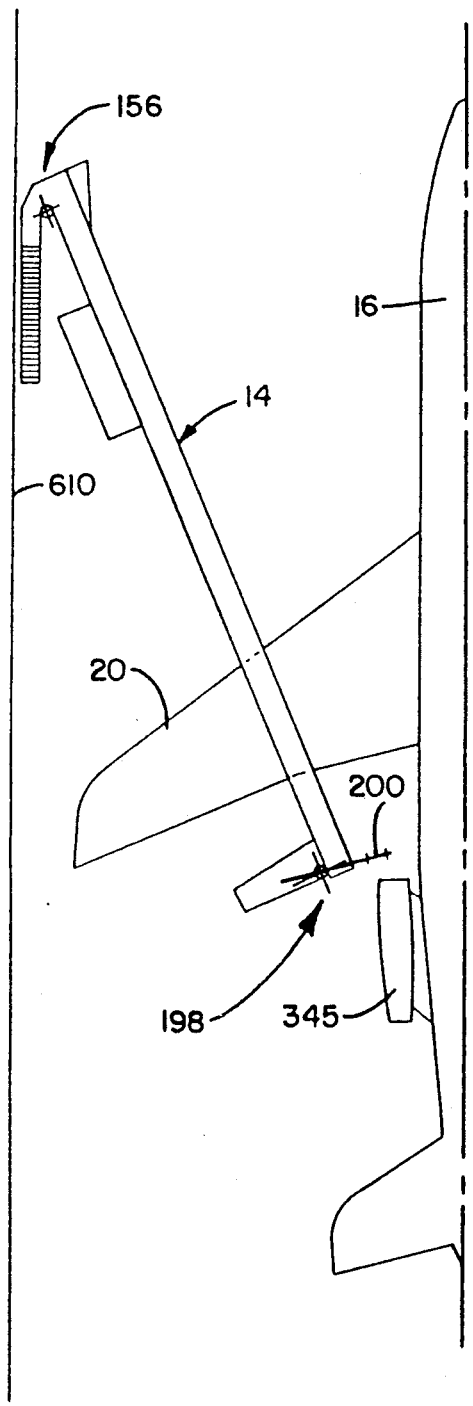
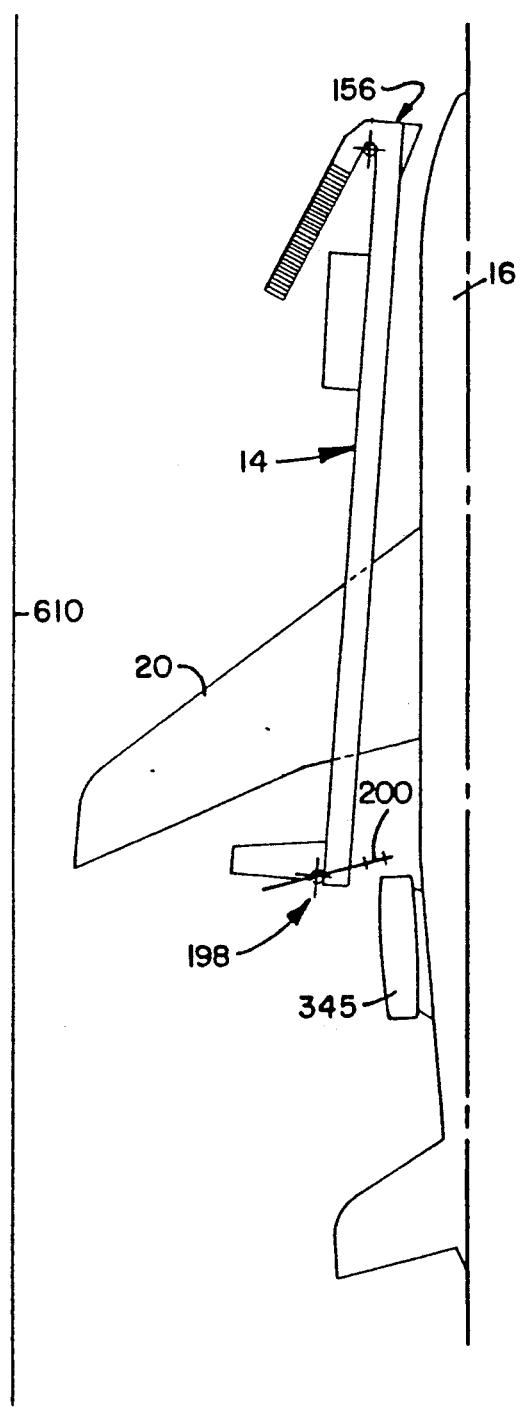

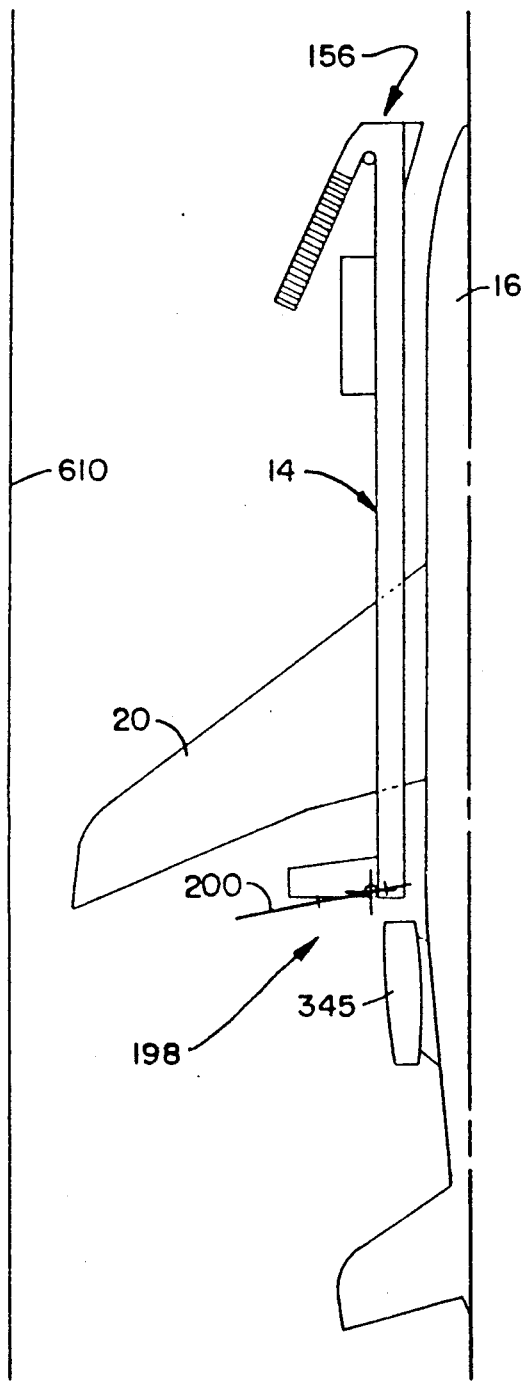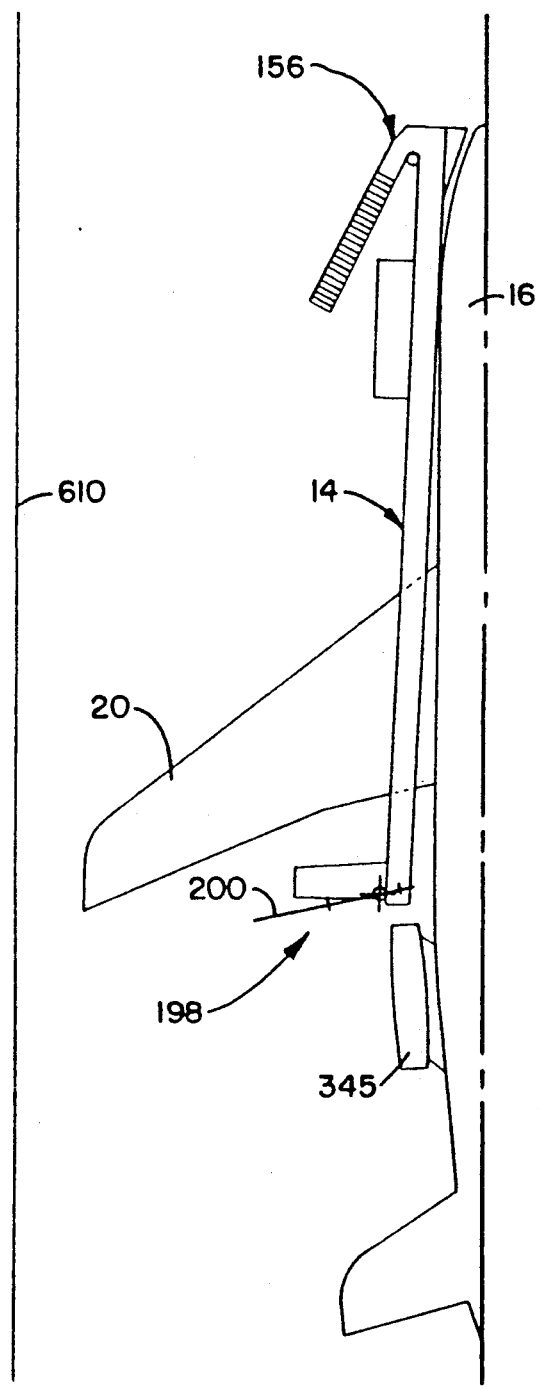

BRIDGE DOCKING STRUCTURE FOR AIRCRAFT

BACKGROUND OF THE INVENTION

1. Field of the Invention

This invention relates to systems which are used to provide access to commercial jet aircraft during maintenance. More specifically, the invention relates to an aircraft maintenance system that is simple to deploy and is more effective at providing access to different types of aircraft than systems which have previously been used.

2. Description of the Prior Art

Regular and thorough maintenance is necessary to ensure that the large fleets of modern airliners used in commercial aviation are as safe and reliable as possible. For economic reasons, it is important that such maintenance be carried out as quickly and efficiently as possible.

In practice, it is sometimes difficult for individual maintenance personnel to gain access to desired areas on an aircraft. To address this problem, certain roof-suspended scaffolding systems have been devised. Such a system is disclosed in U.S. Pat. No. 3,602,335 to Gustetic. Among other disadvantages, such systems often require reinforcement of the roof of a maintenance hangar before they can be deployed. Other, prior art systems include those disclosed in U.S. Pat. Nos. 3,256,955 to Izmirian et al., and 3,831,709 to Stanford et al.

One problem that is common to all three of the above-disclosed systems is that, generally, they are not readily adjustable to receive different types of aircraft. For example, most aircraft have a characteristic downward inclination from the nose of the fuselage toward the tail section while they are resting on the ground. Typically, prior art maintenance systems are not readily adjustable at both ends to accommodate themselves to such differences between aircraft. Furthermore, prior art systems are not length-adjustable to permit servicing of different sizes of aircraft. These are all significant disadvantages to the prior art, since most commercial airlines have several different types of aircraft in their fleets.

Another problem not addressed by existing systems is that exit and entry ports along the fuselage of the aircraft are typically not arranged in a linear path. In systems that use strictly horizontal access walkways along the length of the fuselage, maintenance personnel are forced to traverse significant vertical upward or downward steps to gain entry to the fuselage at certain points. This, of course, presents danger, particularly when tools or aircraft components are carried into or out of the fuselage.

Yet another problem that exists in such systems is the difficulty of gaining access to the various engines of the aircraft. For example, a Boeing 727 airliner has three engines, all in the tail section of the aircraft. To date, no system has been devised which provides adequate access to all three engines, particularly when removal of one or more of the engines is required.

It is clear that there has existed a long and unfilled need in the prior art for an aircraft maintenance facility that can be deployed without reinforcement of a maintenance hangar, which is adjustable to the inclination of different types of aircraft, which is vertically adjustable to provide access to different ports along an aircraft fuselage, and which is readily adaptable to provide access to engines on an aircraft.

SUMMARY OF THE INVENTION

Accordingly, it is an object of this invention to provide an aircraft maintenance facility that does not necessitate reinforcement of an aircraft maintenance hangar.

It is further an object of the invention to provide an aircraft maintenance facility that is adjustable to the characteristic inclination of different types of aircraft.

It is further an object of this invention to provide an aircraft maintenance facility which provides vertically-adjustable access along different points of an aircraft fuselage.

It is also an object of the invention to provide ready access to each of the different engines of an aircraft.

It is yet further an object of the invention to provide an aircraft maintenance facility that is quickly deployable in operative position adjacent an aircraft.

To achieve these and other objects of the invention, an aircraft maintenance facility according to a first aspect of the invention includes a fuselage dock assembly comprising a first ground-supported column, a second ground-supported column and a walkway section supported by the first and second columns; a tail dock assembly having a recess defined therein for receiving the tail section of an aircraft; and an engine stand for servicing an engine of the aircraft that is not readily accessible from the fuselage dock assembly or the tail dock assembly.

According to a second aspect of the invention, a fuselage dock assembly for aircraft maintenance and repair includes a first ground-supported column; a second ground-supported column; a walkway section supported in a first location by the first column and at a second location by the second column; and structure for adjusting the height and inclination of the walkway section relative to a horizontal plane, whereby the walkway section will conform to the natural inclination of a particular aircraft.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 1 is a top plan view of an aircraft maintenance and repair system constructed according to a preferred embodiment of the invention;

FIG. 10 is a fragmentary cutaway side elevational view of a second, rear trolley assembly in the system illustrated in FIGS. 1-9;

FIG. 11 is a fragmentary cutaway front elevational view of the rear trolley assembly illustrated in FIG. 10;

FIG. 25 is a fragmentary diagrammatic cross-sectional view of a guard rail fold-over hinge according to one aspect of the invention; and FIGS. 26(a)-26(e) are diagrammatical views of a facility according to FIGS. 1-25 being deployed in operative position adjacent an aircraft.

DETAILED DESCRIPTION OF THE PREFERRED EMBODIMENT(S)

Figure 2A:
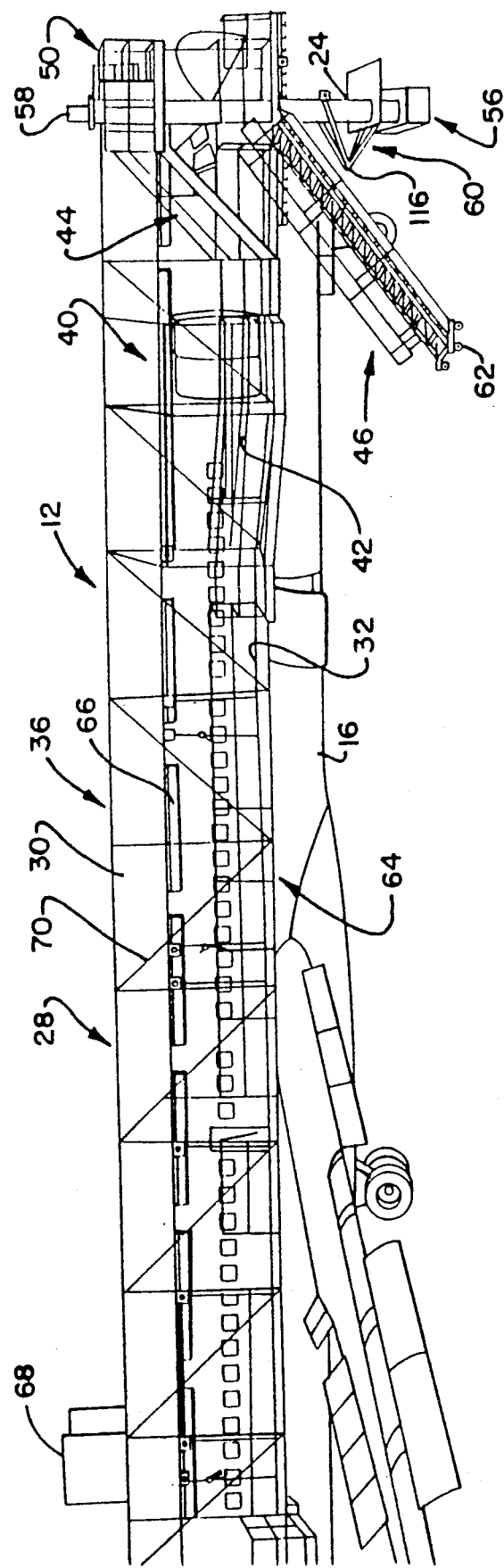
FIG. 2 is a side elevational view of the aircraft maintenance and repair system illustrated in FIG. 1.
Figure 2B:
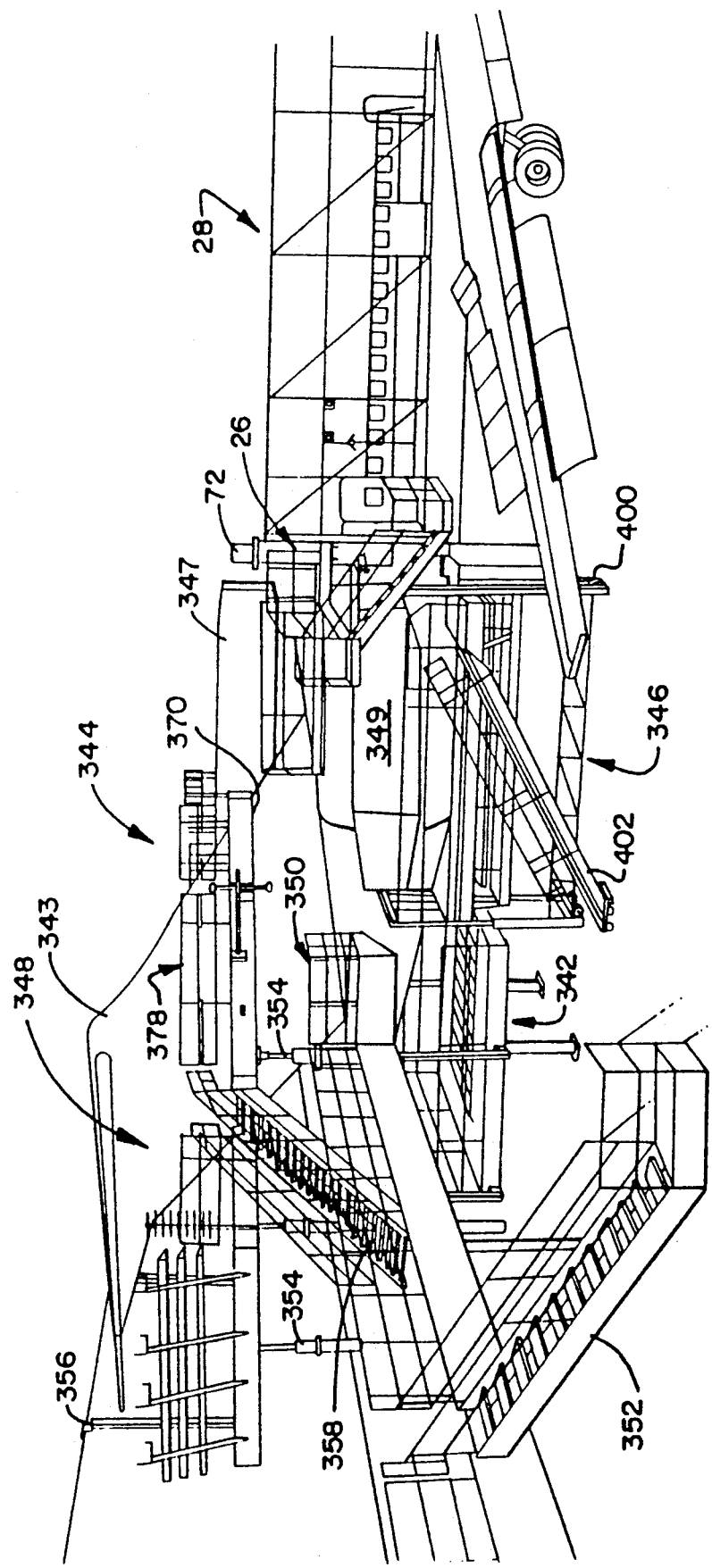

Referring now to the drawings, wherein like reference numerals designate corresponding structure throughout the views, and referring in particular to FIGS. 1 and 2, an aircraft maintenance and repair system 10 constructed according to a preferred embodiment of the invention includes a first fuselage docking assembly 12 and a second fuselage docking assembly 14. Docking assemblies 12, 14 are positioned on opposite lateral sides of a fuselage 16 of an aircraft 15, as may be seen in FIGS. 1 and 2. Aircraft 15 further has a nose section 18, a left wing 20 and a right wing 22. It should be understood that docking assemblies 12, 14 are substantially identical except that they are constructed so as to be symmetrically opposite to each other, although other minor variations can be made to ensure compatibility with asymmetrical features on different types of aircraft.

Referring primarily to FIG. 2, each dock assembly 12, 14 includes a first ground-supported column 24, a second ground-supported column 26 and a walkway section 28 which is supported at a first location by column 24 and at a second location by column 26. Both column 24 and column 26 are height adjustable, which allows the height and inclination of walkway 28 to be adjusted relative to a horizontal plane. In this way, the walkway section can be adjusted to conform to the natural inclination of several different types of aircraft. The walkway section could also be vertically lowered to gain access to the landing gear on an aircraft. The specific structure which permits the columns 24, 26 to be so adjusted is discussed in greater detail below.

Figure 3:
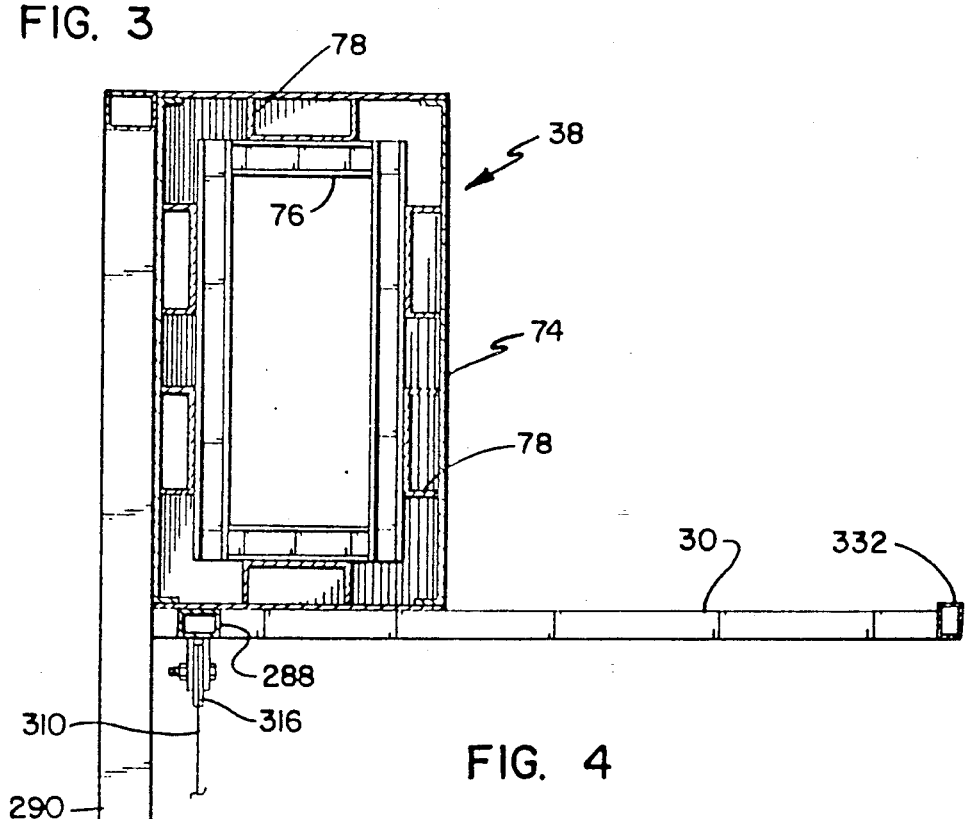
FIG. 3 is a cross-sectional view taken along one point of a walkway section in the system illustrated in FIGS. 1 and 2.

Referring again to FIG. 2, it will be seen that walkway section 28 includes an upper level walkway 30 and a lower level walkway 32, for accessing different vertical portions of the fuselage 16. An inside edge 34 of lower level walkway 32 is depicted in FIG. 1. As can be seen in FIG. 3, the inside surface of upper level walkway 30 extends further inwardly than inside surface 34, so as to conform to the outer curvature of the fuselage 15.

One particularly important feature of the invention is the provision of a stress reinforcing member 36 which extends along the length of walkway section 28. As may be seen in FIGS. 3 and 4, stress reinforcing member 36 is embodied as a box-like beam 38, which is constructed to stiffen walkway section 28 against torsional deformation in response to torsional moments which would be created by weight on upper level walkway 30. The specific construction of box-like beam 38 will be discussed in greater detail below in reference to FIGS. 3 and 4.

Looking again to FIGS. 1 and 2, walkway section 28 includes a forward work platform 40 which is designed to be positioned proximate a forward entry port of aircraft 15. Shelving 42 is provided integrally on walkway section 28 immediately proximate work platform 40, for ready storage of tools or aircraft components. An inter-level stairway 44 is provided at a forward end of work platform 40 for access between walkways 32, 30. As can best be seen in FIGS. 2 and 15, a lower stairway section 46 is pivotally mounted at an upper end to walkway section 28, and is supported by the underlying ground surface on a second, lower end by casters 62. As a result, lower stairway section 46 will continuously adjust relative to the ground as walkway section 28 is raised or lowered. Casters 62 permit lower stairway section 46 to move with dock assembly 12, 14 during deployment of the dock assembly 12,14 in position adjacent to an aircraft 15.

Figure 12:
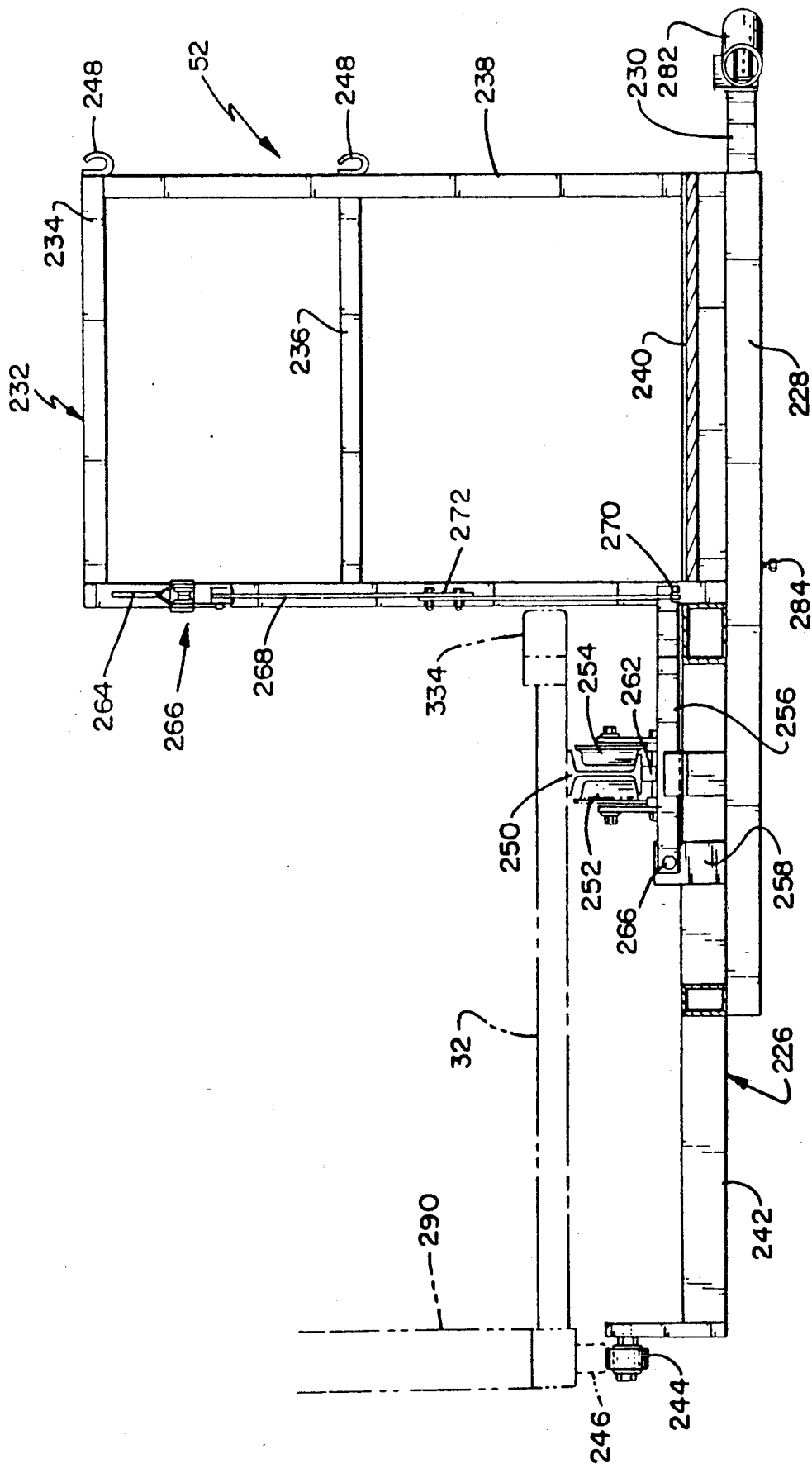
FIG. 12 is a fragmentary cross-sectional view of an extendable nose-engaging section in the system illustrated in FIGS. 1-11.
Figure 15:
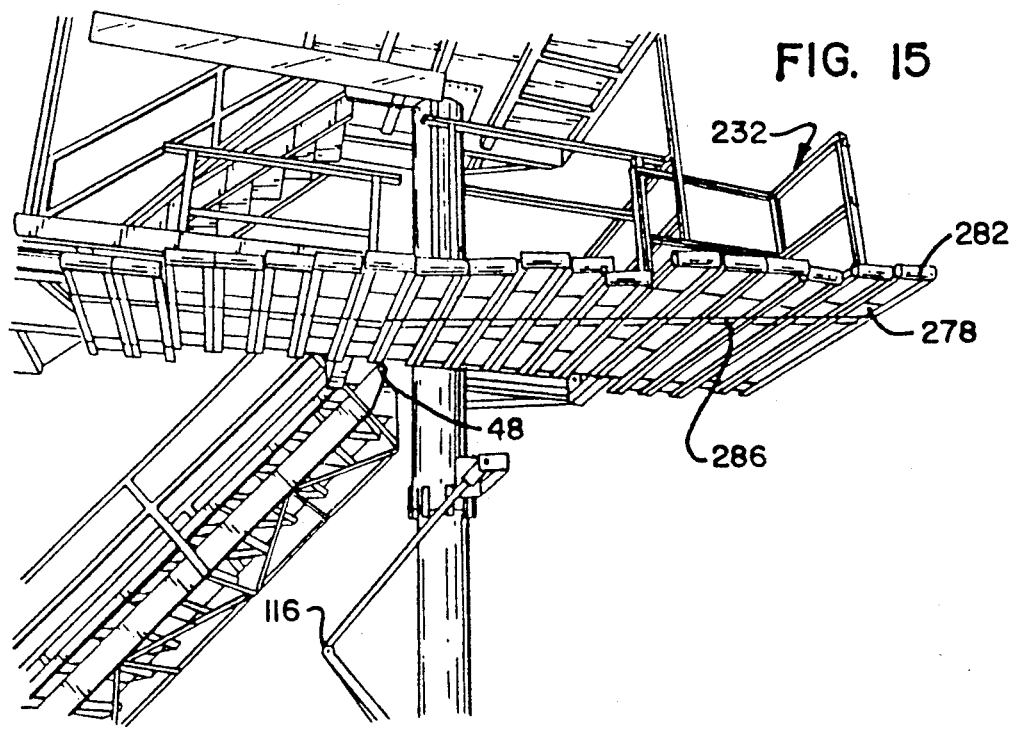
FIG. 15 is a lower perspective view of a forward portion of the system illustrated in FIGS. 1-14.

Each dock assembly 12, 14 further includes an extendable nose-engaging portion 52, as can best be seen in FIGS. 1, 12 and 15. Each extendable nose-engaging portion 52 includes a plurality of slide board members 54 which are individually extendable to conform to the outer dimensions of nose section 18 of aircraft 15. The various features of nose engaging portion 52 will be discussed in greater detail below.

As may be seen in FIG. 2, first ground-supported column 24 is mounted on a forward trolley unit 56, which will be described in greater detail with reference to FIGS. 5, 8 and 9. An electric motor 58 is mounted on a top end of column 24, for controlling the height adjustment thereof. An alignment mechanism 60 is further provided to ensure that the components of columns 24 remain aligned during extension and retraction.

According to one important feature of the invention, a plurality of adjustable work platforms 64 are provided within the main truss system 70 of walkway section 28. By individually adjusting the level of the various work platforms 64, walkway section 28 can be made to conform to the various ports and entry ways on different types of aircraft. This is an important advantage, since the various ports and entry ways on aircraft are frequently not in linear alignment.

Other features of walkway section 28 include a plurality of fluorescent lights 66, most of which are mounted on the lower surface of upper level walkway 30 to illuminate the area beneath. An electrical distribution panel 68 is part of an overall electrical distribution system which provides power to the fluorescent lamps 66, as well as to numerous electrical outlets throughout the walkway section 28. Dock assemblies 12, 14 further include a system for distributing compressed air, and may also be adapted to distribute heat or air conditioning into the fuselage by using box-like beam 38 as a distribution manifold.

Figure 4:
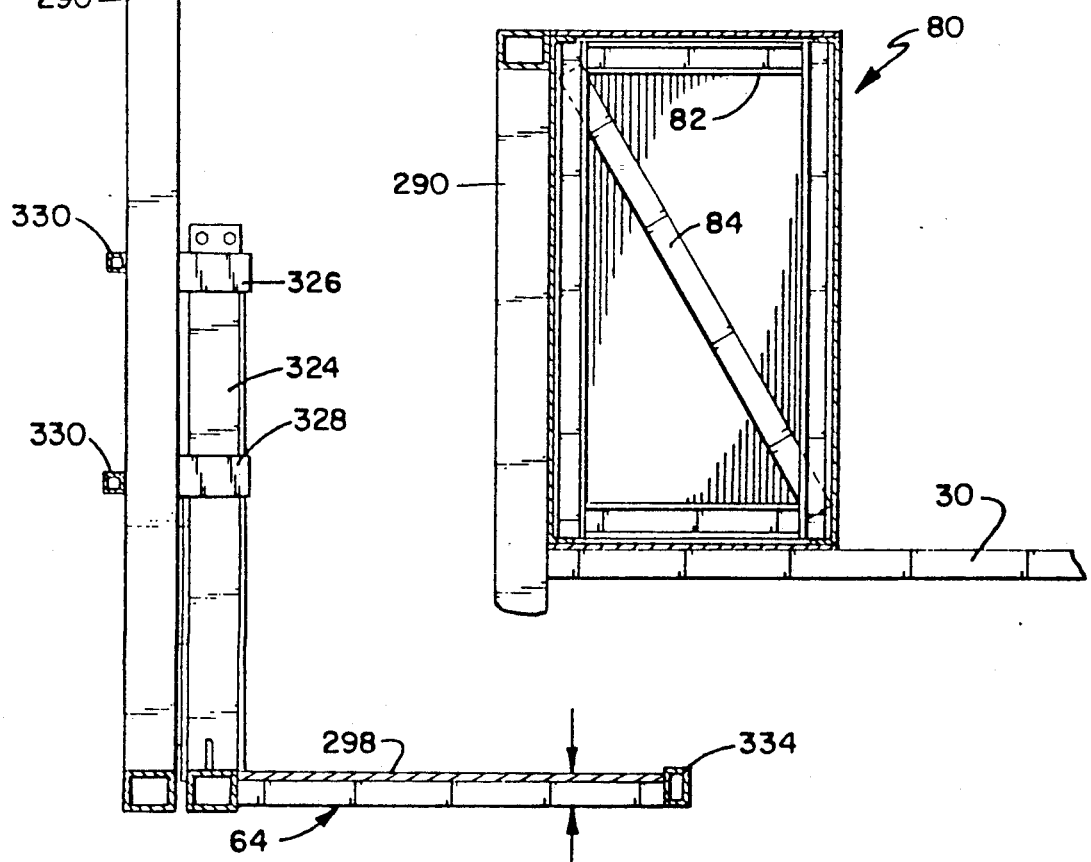
FIG. 4 is a fragmentary cross-sectional view taken along a second portion of the walkway section.

Referring now to FIGS. 3 and 4, each box-like beam 38 includes an outer skin 74 which is metallic and rectangular in cross-section, as may be seen in FIG. 3. Periodically along the length of beam 38 are positioned interior framing members 76, which are also rectangular in cross-section and are fabricated by four heavy duty steel structural elements welded together in rectangular fashion. A plurality of stiffener elements 78 each having a U-shaped cross-section extend longitudinally within box-like beam 38 between outer skin 74 and the outer edges of interior framing member 76. Upper level walkway 30 is welded to a lower surface of outer skin 74, as may be seen in FIG. 3. When weight is placed upon upper level walkway 30, a torsional force will be transmitted in a clockwise direction to box-like beam 38. This force is transmitted through stiffeners 78 to the interior framing member 76 which provide additional resistance against deformation. As a result, upper level walkway 30 may be made as long as necessary to service a fuselage 16, without fear of torsional deformation.

FIG. 4 illustrates box-like beam 38 at a joint portion 80 which joins various sections of outer skin 74. At joint portions 80, a joint framing member 82 formed from heavy steel structural elements into a rectangular shape is provided for coupling the outer skin portion 74 and the stiffeners 78. For further reinforcement against torsional deformation at this point, a diagonal brace 84 is further provided within the joint framing member 82.

Figure 5:
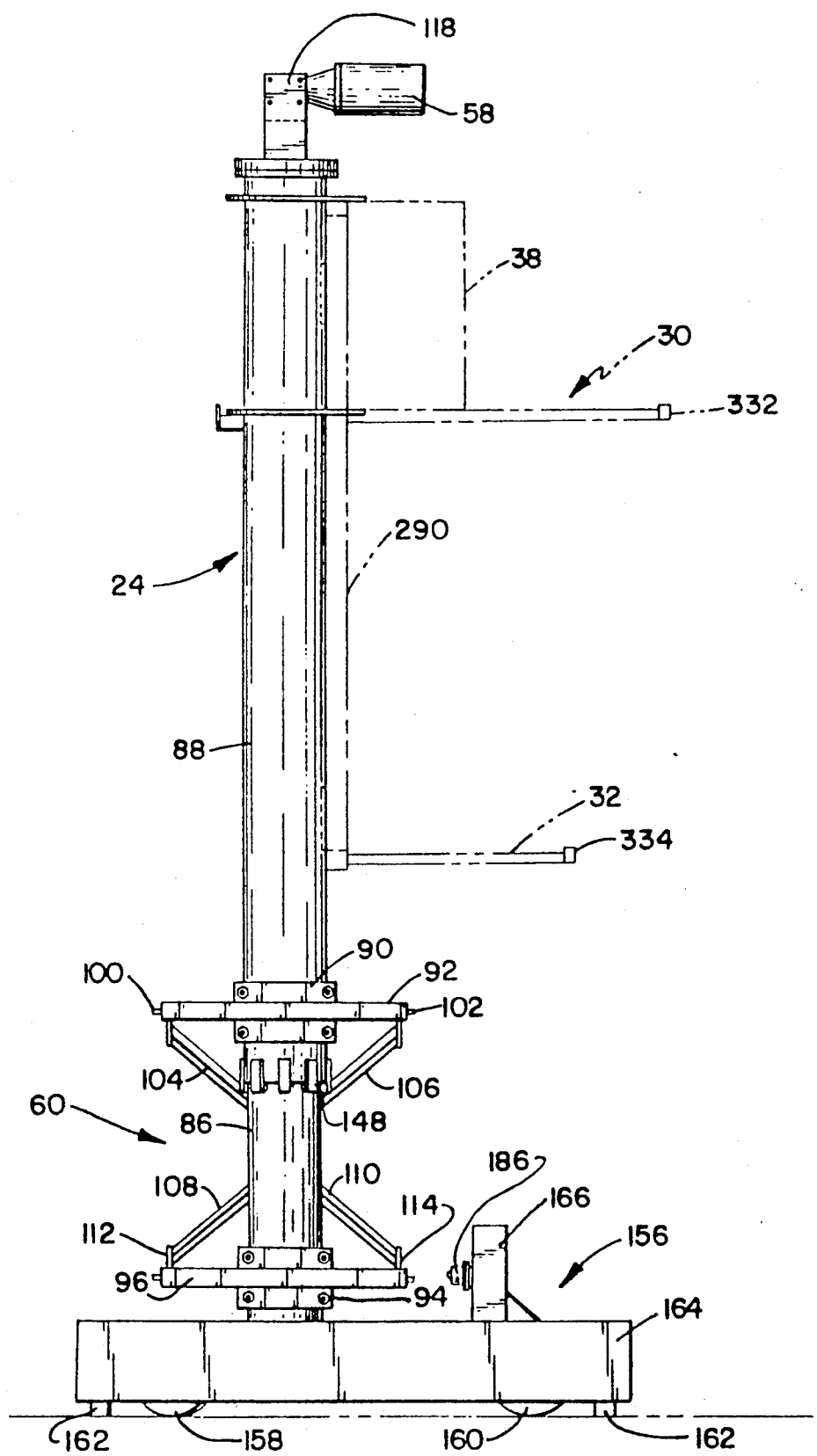
FIG. 5 is a fragmentary isolational view of a first ground-supported column in the system which is illustrated in FIGS. 1-4.
Figure 7:
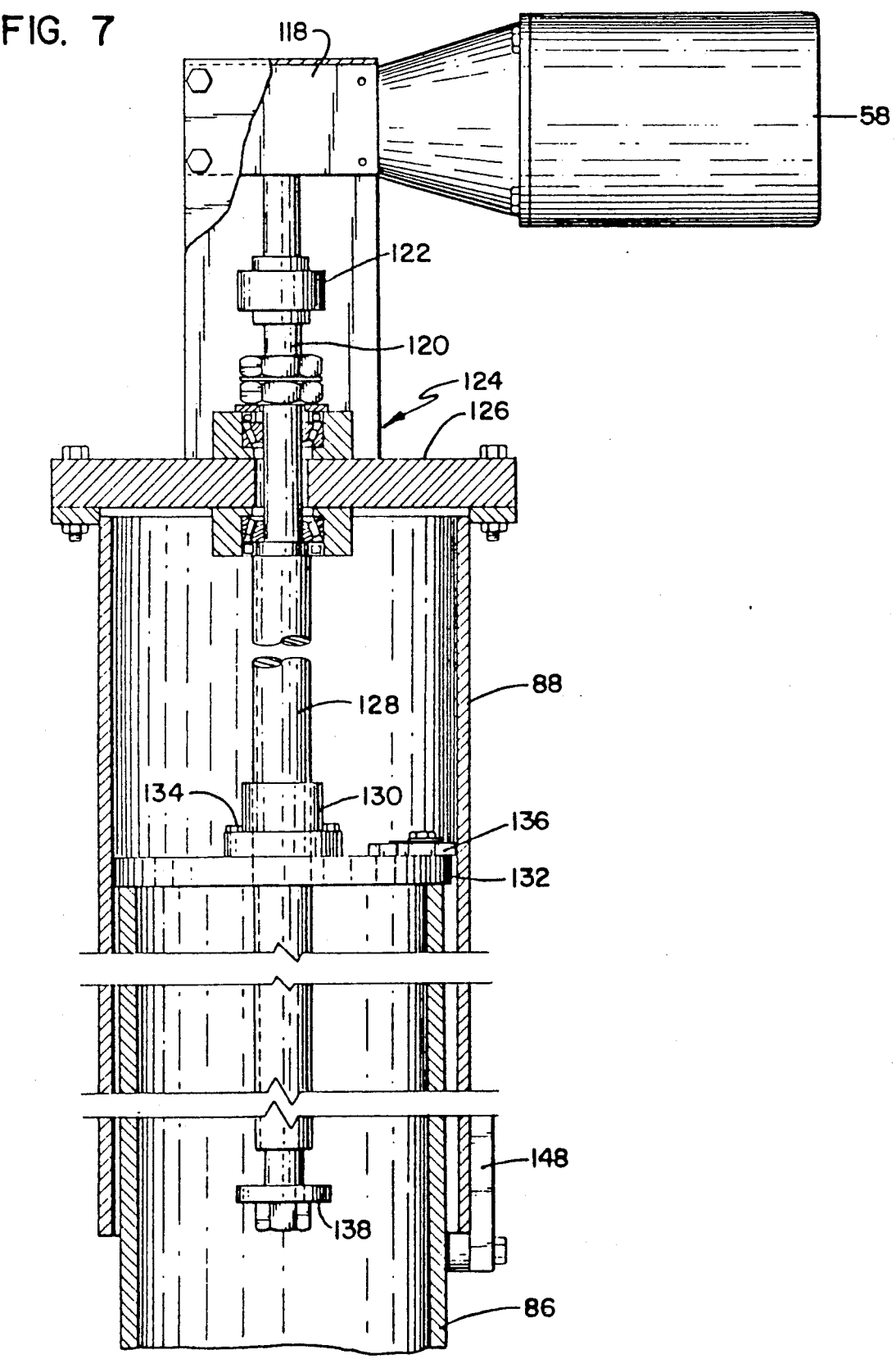
FIG. 7 is a fragmentary cross-sectional view through a section of a column which is illustrated in FIG. 5.

Referring now to FIGS. 5 and 7, the construction of first ground-supported column 24 and accessories thereto will now be described in detail. As may be seen in FIG. 5, first ground-supported column 24 includes a first tubular member 86 which is telescopingly received within a second, upper tubular member 88. Alignment mechanism 60 maintains first tubular member 86 in rotational alignment with respect to second tubular member 88 as the members 86, 88 are moved relative to each other. As may be seen in FIG. 5, alignment mechanism 60 includes an upper collar 90 which is mounted to second tubular member 88, and a lower collar 94 which is mounted to first tubular member 86. An upper cross bar 92 and a lower cross bar 96 are mounted to the upper and lower collars 90, 94, respectively. A first arm 104 and a second arm 106 are hingedly mounted to opposite ends of upper cross bar 92 by first and second hinges 100, 102, respectively. Similarly, a third arm 108 and a fourth arm 110 are hingedly mounted to opposite ends of lower cross bar 96 by a third hinge 112 and a fourth hinge 114, respectively. First, second, third and fourth arms 104, 106, 108 and 110 are connected together at second, opposite ends thereof by a common hinge mechanism 116 as may be best seen in FIG. 15.

Referring again to FIGS. 5 and 7, the jack screw mechanism for raising and lowering first ground-supported column 24 will now be described in detail. As may be seen in FIG. 7, a gear reduction unit 118 is provided for transmitting power from an electric brake-motor assembly 58 to a shaft 120 via a coupling 122. Brake-motor assembly 58 is a commercially available unit taht applies a braking action to its output shaft at all times other than when power is being supplied to turn a motor therein. Shaft 120 is mounted for rotation relative to a cover plate 126 on top of second tubular member 88 by a thrust roller bearing 124. As may further be seen in FIG. 7, shaft 120 includes a lower threaded shaft portion 128 on an end thereof which is positioned thrust roller bearing 124. Threaded shaft portion 128 is threadedly engaged with a threaded follower member 130, which is mounted to a cover plate 132 via bolts 134. Cover plate 132 is secured to a top end of first tubular member 86. It will be appreciated that rotation of shaft 120 by motor 58 will cause second tubular member 88 to either extend or retract from first tubular member 86, depending upon the direction of rotation. In this way, the extension of first ground-supported column is controlled, and the height and inclination of walkway 28 may be adjusted relative to a horizontal plane. Limit switches (not shown) are also provided to limit relative extension and contraction of the members 86, 88 beyond predetermined upward and downward limits by cutting off power to the motor 58.

As may further be seen in FIG. 7, a plurality of composite slide bearings 136 are mounted to the cover plate 132 on top of first tubular member 86. In the preferred embodiment, at least three slide bearings 136 are provided between the tubular members 86, 88 and are spaced at even intervals along the upper circumference of first tubular member 86. Slide bearings 136 ensure smooth, slop-free movement between the members 86, 88. As may be seen in FIG. 5, a plurality of retention bearings 148 are mounted to a lower end portions of second tubular member 88 to further stabilize movement between the elements 86, 88 and to prevent the elements 86, 88 from slipping apart. A stop plate 138 is further provided at a lowermost end of shaft 120 for limiting upward movement of second tubular member 88 with respect to cover plate 132.

Figure 6:
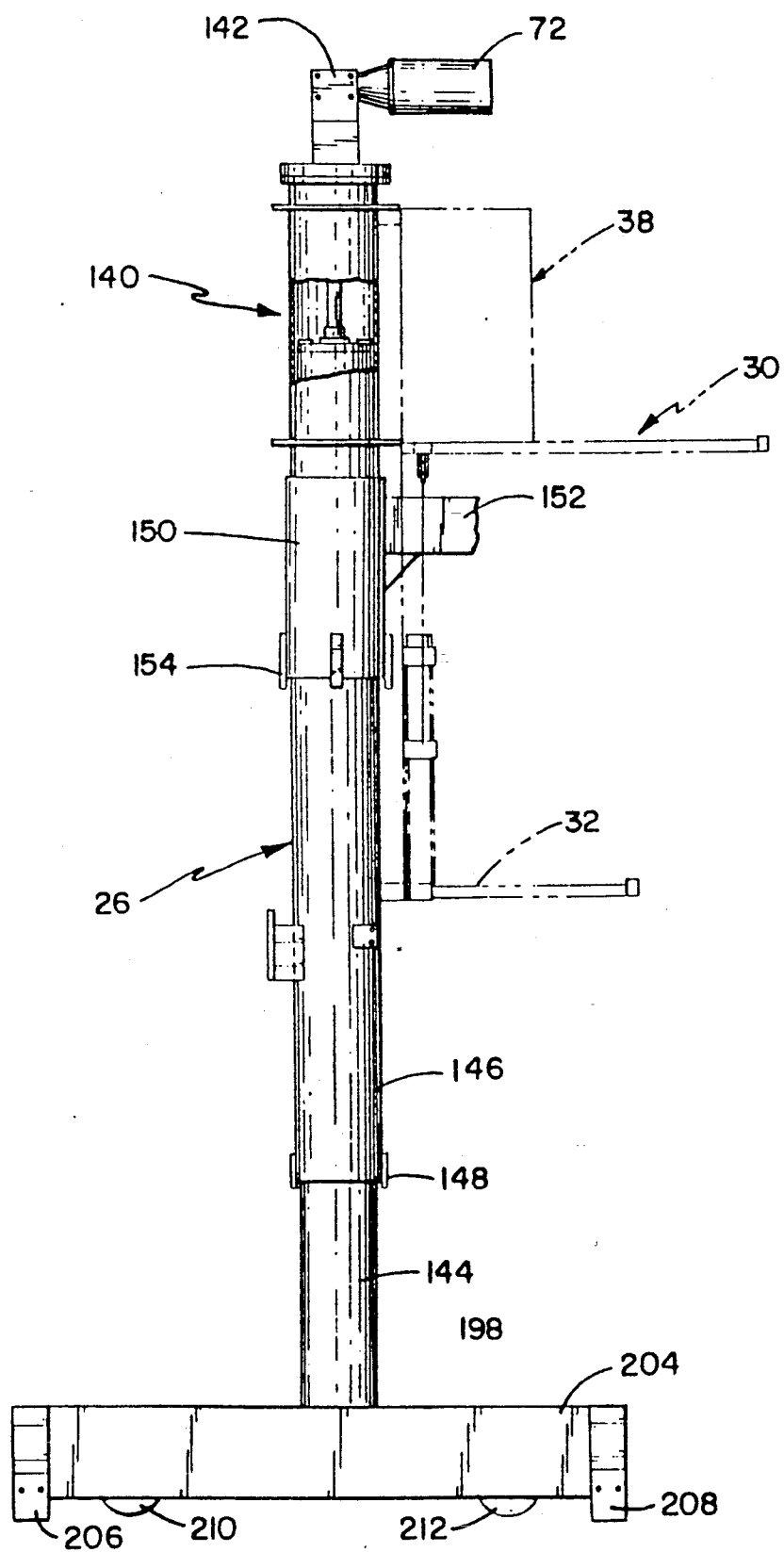
FIG. 6 is a fragmentary isolational view of a second ground-supported column which is illustrated in FIGS. 1-5.

FIG. 6 depicts the specific construction of second ground-supported column 26. Second ground-supported column 26 includes a jack screw arrangement 140 which is substantially the same as that which is provided for first ground-supported column 24. A gear reduction unit 142 is provided for transmitting power from electric motor 72 to the jack screw arrangement 140. Jack screw arrangement 140 telescopingly adjusts the position between a first tubular member 144 and a second tubular member 146.

A rotatable pivot sleeve 150 is mounted for rotation about second tubular member 146. Retention bearings 154 are provided to maintain pivot sleeve 150 in alignment with second tubular member 146. A support arm 152 extends from rotatable pivot sleeve 150 for supporting an engine inlet access plank 360, as may be seen in FIG. 17. A rotary mechanical transmission which is powered by a crank 362 is also mounted to an outer surface of pivot sleeve 150 for rotating sleeve 150 relative to second tubular member 46. The purpose of plank 360 will be discussed in greater detail below.

Figure 8:
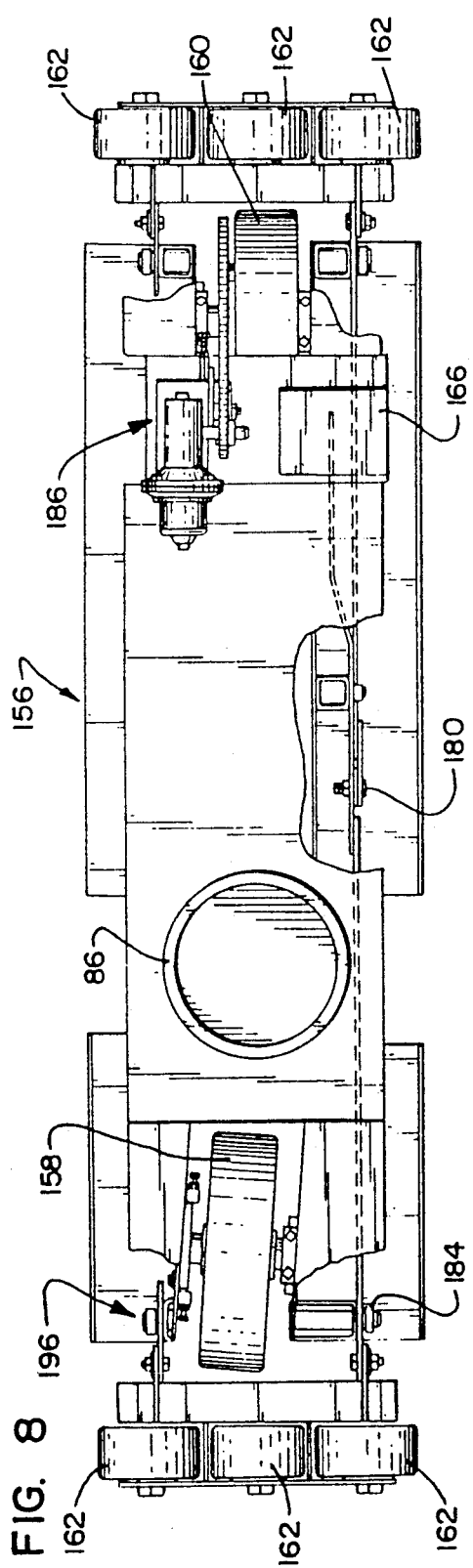
FIG. 8 is a cutaway top plan view of a forward trolley in the system which is illustrated in FIGS. 1-7.
Figure 9:
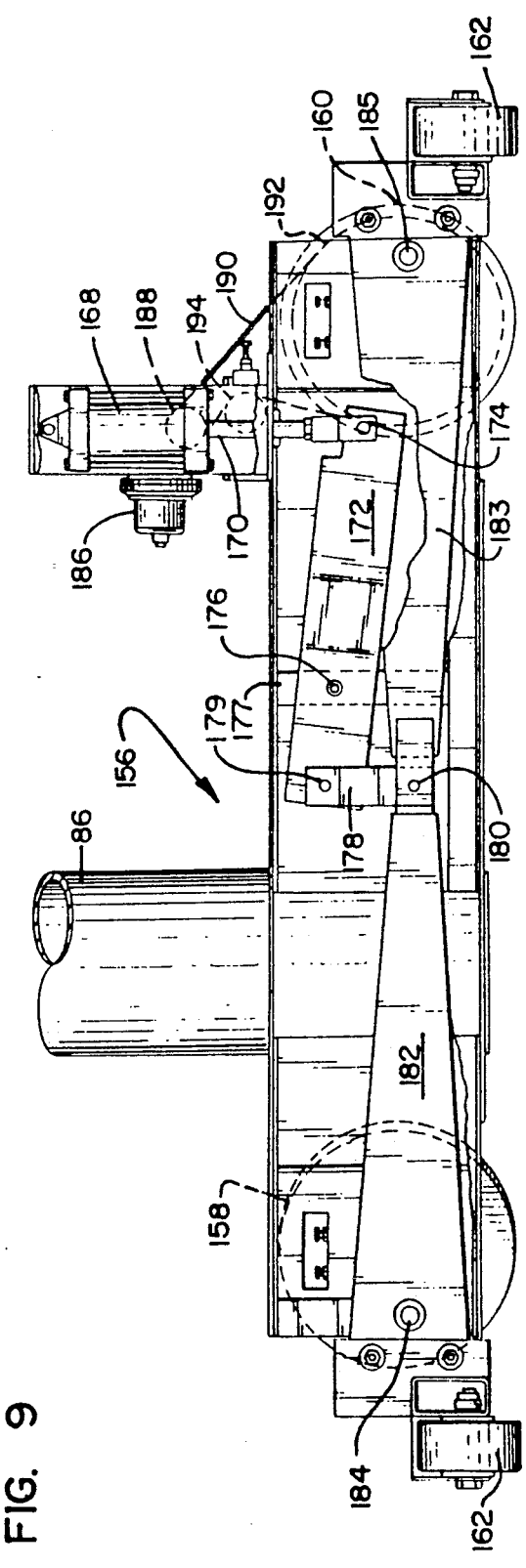
FIG. 9 is a fragmentary cutaway view of the forward trolley illustrated in FIG. 8.

Referring now to FIGS. 5, 8 and 9, the specific construction of forward trolley assembly 156 will now be described in detail. Forward trolley 156 includes a first large wheel 158 and a second large wheel 160. First large wheel 158 is mounted to rotate in a plane which is slightly angled with respect to the plane in which second large wheel 160 is mounted to rotate. As a result, each forward trolley assembly 156 will move in a radiused path, the significance of which will be discussed below with reference to FIGS. 26(a)–26(e). Trolley assembly 156 further includes a plurality of smaller wheels 162 which are mounted laterally on the outer ends of trolley assembly 156. The smaller wheels 162 are mounted to rotate in planes which are substantially perpendicular to the paths in which large wheels 158, 160 are mounted to rotate in. Specifically, the path in which large wheels 158, 160 are mounted to rotate in is substantially perpendicular to the longitudinal axis of fuselage 15, while the planes in which wheels 162 rotate in are parallel to the axis.

As may be seen in FIG. 5, forward trolley assembly 156 includes an outer housing 164 which is secured to a lower end of first tubular member 86. A pneumatic actuator housing 166 is mounted to an upper portion of outer housing 164. A pneumatic cylinder 168 is mounted within housing 166. A piston having a shaft 170 is sealingly provided within cylinder 168 for extension and retraction according to pneumatic pressure within cylinder 168. As is best shown in FIG. 9, piston shaft 170 is connected at a lower end to a lever arm 172 via a pivot connection 174. Lever arm 172 is itself pivotally mounted about a pivot point 176 with respect to a vertical support member 177 that is fixed relative to outer housing 164. Lever arm 172 is mounted to a linkage 178 at a second opposite end from its connection to piston arm 170 by a pivot connection 179. A second, opposite end of linkage 178 is connected to first ends of a first wheel support arm 182 and a second wheel support arm 183 via a pivot connection 180.

As is further shown in FIG. 9, first wheel support arm 182 is pivotally mounted with respect to housing 164 by a pivot connection 184. A plurality of the small wheels 162 are fixedly mounted to first wheel support arm 182 on an opposite side of pivot connection 184 from linkage 178. Similarly, the second set of small wheels 162 are connected to second wheel support arm 183 on an opposite side of pivot connection 185 from the pivot connection 180 which connects linkage 178 and second wheel support arm 183. From the above it will become apparent that extension of piston shaft 170 will cause linkage 178 to be pulled upwardly, thereby causing both sets of small wheels 162 to move downwardly beneath the lowermost points on the first and second large wheels 158, 160. As a result, forward trolley assembly 156 will rest entirely upon the small wheels 162. When piston shaft 170 is retracted, small wheels 162 will likewise retract, thereby leaving the entire weight of forward trolley assembly 156 on the first and second large wheels 158, 160.

Forward trolley assembly 156 further includes a pneumatic motor 186 which includes an output sprocket 188 that is connected to a drive chain 190. Drive chain 190 is engaged with a wheel sprocket 192 on second large wheel 160. An adjustable guide sprocket 194 is also engaged with drive chain 190 for adjusting the tension on drive chain 190. When motor 186 drives output sprocket 188, power is transmitted to second large wheel 160 via drive chain 190 to move the trolley assembly 156 in an arcuate motion which is dictated by the differing inclinations of first large wheel 158 and second large wheel 160. The movement of trolley assemblies 156 in relation to the overall system will be discussed in greater detail below.

Referring now to FIGS. 10 and 11, the specific instruction of the rear trolley assembly 198 will be described in detail. As may be seen in FIG. 11, rear trolley assembly 198 includes an outer housing 204 which is secured to a lower end of first tubular member 144. Referring briefly back to FIG. 1, the rear trolley assemblies 198 of the different fuselage dock assemblies 12, 14 are mounted on second and first guide rails 202, 200, respectively. Guide rails 202, 200 are preferably mounted in an underlying concrete surface within an aircraft maintenance and repair hangar. As may be seen in FIG. 1, each rail 200, 202 is angled outwardly and rearwardly with respect to a line that is perpendicular to a longitudinal axis of fuselage 16.

Referring back to FIG. 11, a first rail clamp 206 and a second rail clamp 208 are connected to opposite ends of outer housing 204 for engaging the rail 200, 202 upon which trolley assembly 198 is mounted for guidance. Rail clamps 206, 208 effectively engage the contour of rails 200, 202 to stabilize the fuselage assembly 12, 14 when external forces begin to tip the assembly. A first track wheel 210 and a second track wheel 212 are further provided and are engaged with the respective rail as well. A pneumatic motor 214 is mounted within outer housing 204 and includes a drive sprocket 216 which is engaged with a drive chain 218. Drive chain 218 is also engaged with a wheel sprocket 220 on second track wheel 212. A guide sprocket 222 is also engaged with drive chain 218 for adjusting the tension thereof. In this way, pneumatic motor 214 can rotate second track wheel 212, and thus move rear trolley assembly 198 on the respective rail 200, 202.

Turning now to FIG. 12, the specific construction of extendable nose engaging section 52 will now be described in detail. Nose engaging section 52 includes a frame 226 which is longitudinally slidable relative to the lower level walkway 32 of walkway section 28. Frame 226 includes a plurality of horizontally oriented housing members 228 for a corresponding number of slide boards 230. As can be seen in FIG. 15, slide boards 230 allow the inward most edge nose engaging section 52 to better conform to the external dimensions of the nose section 18 of the fuselage 16. A guard rail member 232 having an upper horizontal ramp 234, a lower horizontal rail 236 and a plurality of vertical rails 238 is provided on the edges of a horizontal work platform 240 that are not positionable adjacent to fuselage 16. As may be seen in FIG. 12, work platform 240 is also part of frame 226. Frame 226 further includes a stabilizer arm 242 which extends horizontally towards an outer edge of lower level walkway 32. As can be seen in FIG. 12, a raised track 246 is provided in alignment beneath the vertical frame reinforcing members 290 on lower level walkway 32. A wheel 244 is rotatably mounted to a vertical arm on a distal end of stabilizer arm 242. Wheel 244 is positioned to ride upon track 246. Also mounted to a lower surface of lower level walkway 32 is a longitudinal track 250 that is shaped in the form of an I-beam. I-beam track 250 is engaged on opposite sides thereof by a first wheel 252 and a second wheel 254, both of which are mounted for rotation by brackets which are mounted to a break arm 256. A break pad 262 is also mounted to a top surface of break arm 256, immediately beneath a bottom surface of I-beam track 250. Break arm 256 is itself pivotally connected to a bracket 258 at a pivot connection 266. Bracket 258 is integral with frame 226, as may be seen in FIG. 12.

As further shown in FIG. 12, a lever 264 is pivotally mounted to a vertical rail 238 of guard rail member 232. Lever 264 is connected to a brake linkage 268 via an over-center toggle linkage 266. A second, opposite end of brake linkage 268 terminates in a hook member 270, which is adapted to engage a notch on an end portion of brake arm 256 which is opposite from pivot point 266. As can be seen in FIG. 12, brake linkage 268 is formed in two separate lengths, which are connected together by one or more bolts through adjustment holes 272. In this way, the absolute length of brake linkage 268 can be adjusted.

When lever 264 is in its upward position, as shown in FIG. 12, brake linkage 268 urges break arm 256 to pivot about point 256 in a counterclockwise direction, thereby urging break pad 262 against the bottom surface of I-beam track 250. As a result, nose engaging section 52 is locked in a desired position with respect to walkway section 28. If an operator desires to extend or contract the overall length of a fuselage dock assembly 12, 14, he may pivot lever 264 downwardly, thereby disengaging break pad 262 from the bottom surface of I-beam track 250. The entire nose engaging section 52 will then be supported for rotation relative to walkway section 28 by rollers 244, 252 and 254. Nose engaging section 252 can be slid longitudinally to adjust to the length of fuselage 16 at this point, and then may be relocked relative to walkway section 28 by returning lever 264 to the locked position. Once locked in the desired position, one or more chains may be stretched across the nose section 18 of fuselage 16 from the hooks 248 which are provided on guard rail members 232 of the adjacent dock assemblies 12, 14.

Figure 14:
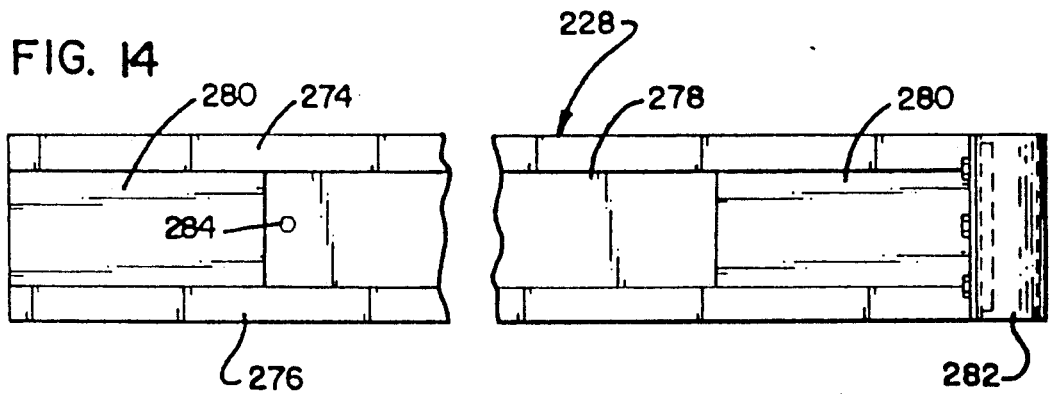
FIG. 14 is a bottom plan view of a second type of slide board assembly.
Figure 13:
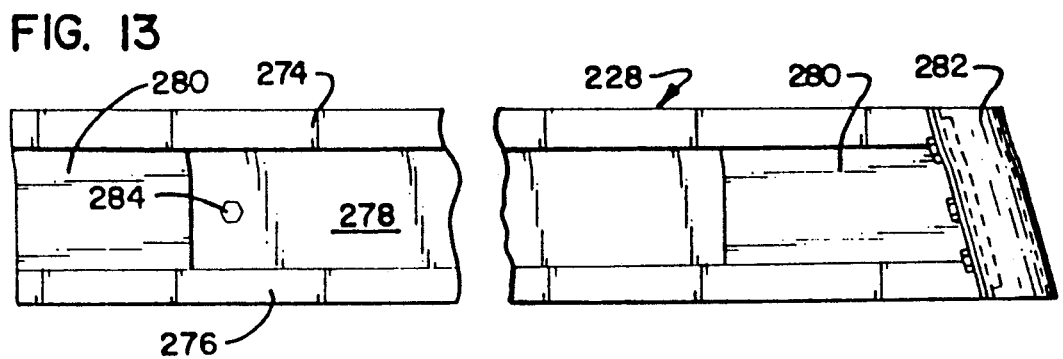
FIG. 13 is a bottom plan view of an extendable slide board assembly in the system illustrated in FIGS. 1-12.

Referring to FIGS. 12-15, the construction of the slide board assemblies will now be discussed. Each slide board 230 is formed from plate metal to have a top surface, a pair of side surfaces and a pair of oppositely facing bottom flanges, leaving an open space therebetween. At one point along the bottom of each slide board 230, a bottom plate 278 is welded to the bottom flanges, thereby giving slide board 230 a complete rectangular cross-section along the length of bottom plate 278. Each bottom plate 278 has a threaded hole defined therein for receiving a retention bolt 284, as can be seen in FIGS. 12-14. Each housing 228 likewise is formed of plate metal and includes a top surface, two side surfaces and flanges 274, 276 at the bottoms thereof. An open bottom portion 280 is defined between flanges 274, 276. As shown in FIG. 15, a reinforcement bar 286 extends transversely in a desired configuration across the different housing members 228. The innermost ends of slide boards 230 are provided with bumpers 282, which are preferably formed of short lengths of polymeric tubing. By extending each slide board 230 so that bumper 282 bears against the side of fuselage 216, those engaging section 52 will conform to the external curvature of nose section 18 of the aircraft 15. Bar reinforcement 286 acts in conjunction with the retention bolts 284 to prevent the slide boards 230 from being pulled too far out of the respective housings 228. The bumper elements 282 can be mounted transversely with respect to the axis of slide boards 230, as is shown in FIG. 14, or at an angle to better conform to the nose section 18, as is illustrated in FIG. 13.

Figure 16:
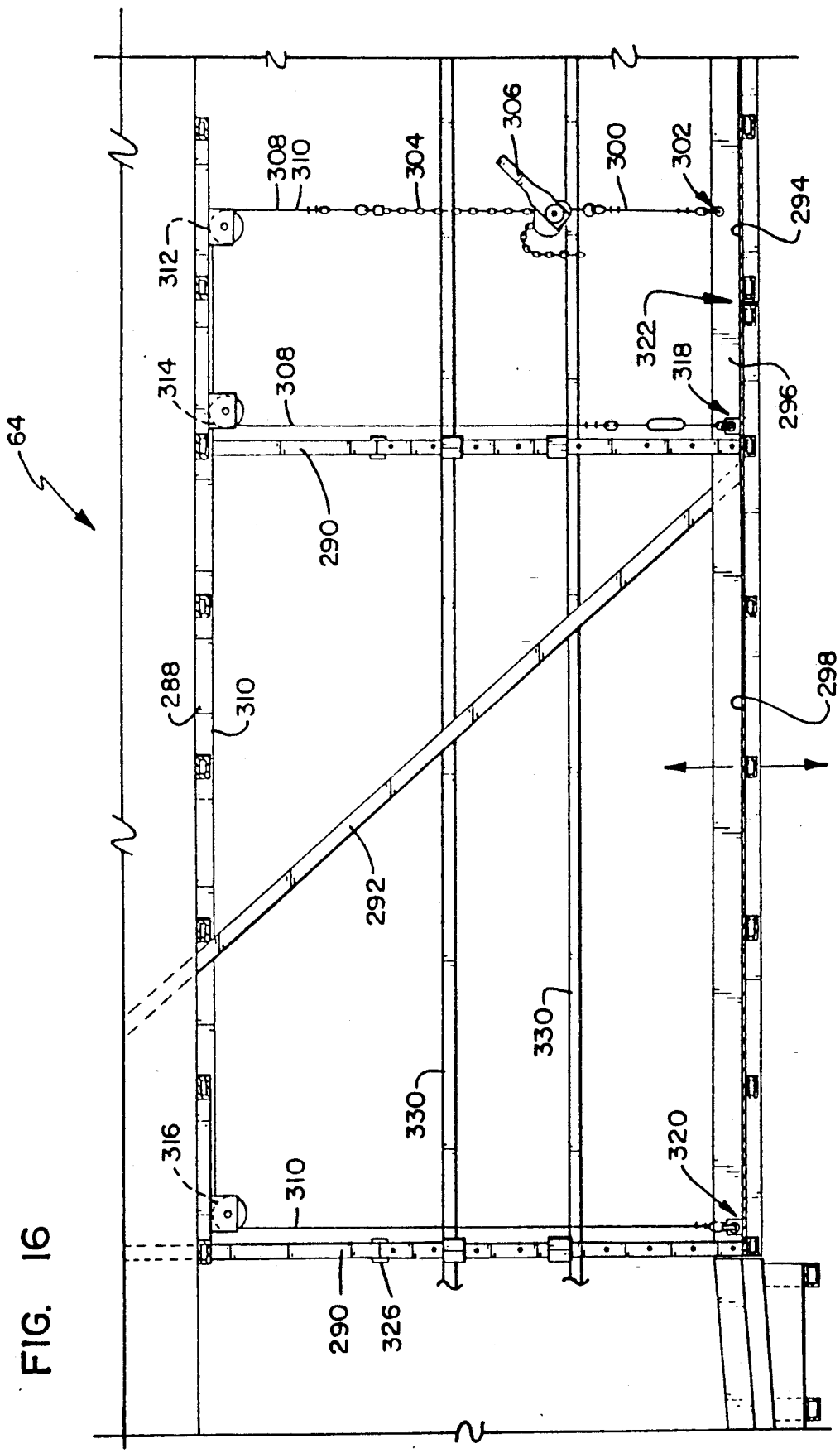
FIG. 16 is a fragmentary elevational view of an adjustable work platform in the system illustrated in FIGS. 1-15.

Referring now to FIGS. 2 and 16, the specific construction of adjustable work platform 64 will now be discussed in detail. As shown in FIG. 2, walkway section 28 includes a main truss system 70 which is formed by a plurality of upper longitudinal frame elements 288, lower longitudinal frame elements 296, vertical frame reinforcing members 290 and diagonal frame reinforcing members 292. The stationary lower walkway surface 294 is suspended from box-like beam 38 and upper longitudinal frame element 288 by diagonal frame reinforcing member 292 and vertical frame reinforcing member 290, as can be seen in FIG. 16. Lower longitudinal frame element 296 is integral with lower walkway surface 294, and provides additional rigidity thereto.

Adjustable work platform 64 includes an adjustable lower walkway surface 298 which is vertically adjustable with respect to stationary lower walkway surface 294. As shown in FIG. 16, adjustable lower walkway surface 298 is in one position abutted against stationary lower walkway surface 294 at a joint 322. A first cable 300 is secured to lower longitudinal frame element 296 by a connection 302. First cable 300 is connected at a second end to second and third cables 308, 310 via a chain 304 and a ratchet winch 306, which is constructed to selectively lengthen or shorten chain 304. As may be seen in FIG. 16, the second and third cables 308, 310 are supported for movement about a first guide pulley 312, which is mounted to upper longitudinal frame element 288. Second cable 308 is supported for movement about a second guide pulley 314, and is connected at a second end to the adjustable lower walkway surface 298 via a connection 318. Second guide pulley 314 is likewise mounted on upper longitudinal frame element 288. Third cable 310 is arranged to pass about a third guide pulley 316 which is also mounted to upper longitudinal frame element 288 above a second, opposite end of adjustable lower walkway surface 298. Third cable 310 has a second end which is connected to the second, opposite end of adjustable lower walkway surface 298 via a connection 320. It will be apparent that adjustable lower walkway surface 298 will be raised with respect to stationary lower walkway surface 294 when an operator uses ratchet winch 306 to effectively shorten chain 304. In this way, an operator can adjust the level of adjustable walkway surface 298 to correspond to the vertical position of a selected port, entryway, or aircraft service point in the fuselage 16 of aircraft 15. Adjustable lower walkway surface 298 may also be lowered beneath the level of walkway surface 294 by allowing chain 304 to ratchet out of winch 306.

Referring back to FIG. 3, it will be seen that a pair of horizontal guard rails 330 are mounted to outer edges of the vertical frame reinforcing members 290, in order to prevent maintenance personnel from falling off of the walkway surfaces 298, 294. A pair of vertical rails 324 are mounted to the adjustable lower walkway surface 298, as is also shown in FIG. 3. A first guide member 326 and a second guide member 328 are provided on each of the vertical frame reinforcing members 290 to constrain the adjustable work platform 64 into vertical movement only.

Figure 24:
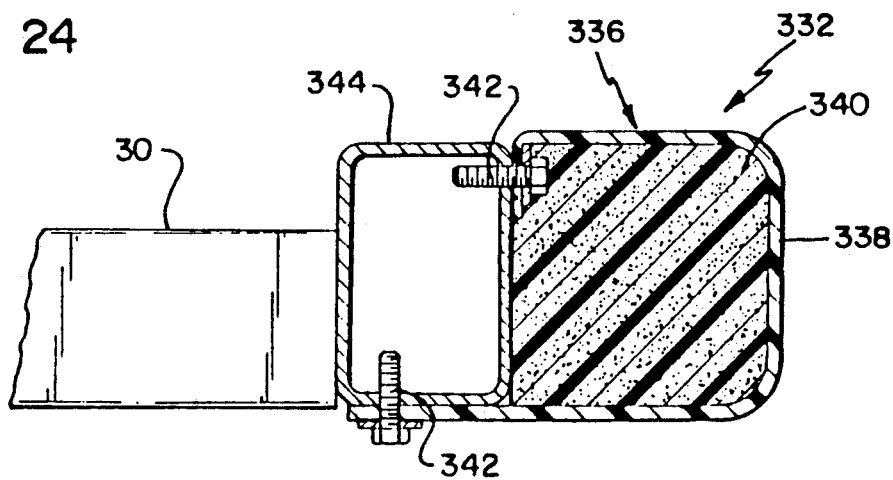
FIG. 24 is a cross-sectional view of a bumper member according to the system which is used to protect the fuselage of an aircraft during maintenance.

Referring briefly to FIGS. 3 and 24, it will be noted that the inside edges of both upper level walkway 30 and lower level walkway 32 are provided with resilient contact bumpers 332, 334, respectively. As shown in FIG. 24, contact bumper 332, which is substantially identical in construction to contact bumper 334, is mounted to upper level walkway 30 by a hollow mounting beam 334 via mounting bolts 342. The bumper 332 itself is formed as a resilient gasket member 336 having a tough resilient outer surface 338 and a foam rubber core 340. Preferably, raising an outer surface 338 is formed from a material such as reinforced neoprene.

Figure 17:
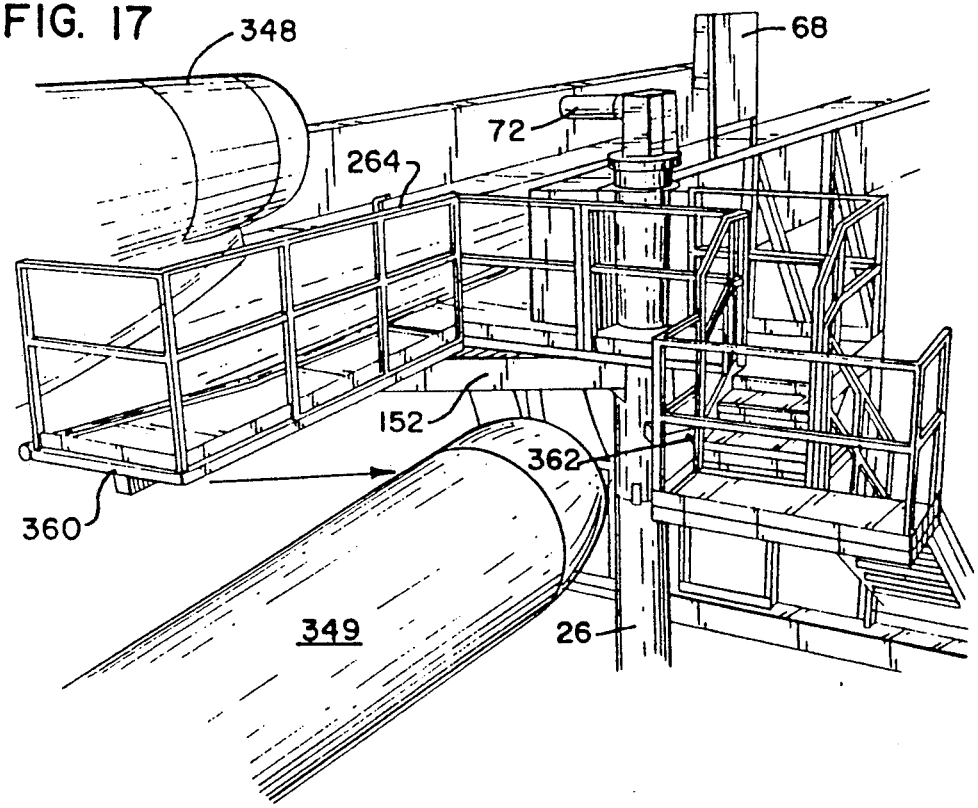
FIG. 17 is a rear perspective view of an aft portion of the system illustrated in FIGS. 1-16.

Referring briefly to FIG. 17, the rearward end of fuselage dock assembly 12, 14 include an engine inlet access plank 360, which is deployable to gain access to the inlet of the Number 2 engine 348 on a Boeing 727 or like aircraft. Access plank 360 is supported by a support arm 152, which is welded to rotatable pivot sleeve 150, as shown in FIG. 6. Rotatable pivot sleeve 150 is mounted for rotation about the second tubular member 146 on second ground-supported column 26, and includes a plurality of retention bearings 154 for supporting the weight of the sleeve 150 and engine access plank 360 relative to second tubular member 146. A manual crank 362 is provided on one side of pivot sleeve 150, as shown in FIG. 17. Crank 362 is connected to a transmission assembly (now shown) which is conventional in nature for rotating sleeve 150 and, hence, support arm 152 and plank 360 relative to second tubular member 146. By turning crank 362, an operator can rotate plank 360 toward or away from the fuselage 16 of aircraft 15 in order to gain access to the cowling of the Number 2 engine 348.

Referring now to FIGS. 1, 2, 17-22 and 25, system 10 further includes a tail stand arrangement 344 for permitting access to a vertical tail section 343 and a number 2 engine 347 of aircraft 15, which in the illustrated embodiment is a Boeing 727 airliner. A pair of stands 346 are further provided within system 10 for gaining access to the number 1 and number 3 engines of aircraft 15.

Referring to FIG. 2, tail stand arrangement 344 includes a horizontal vertically movable upper platform 348 which is supported on a horizontal, fixed mid-level platform 350 by four evenly spaced jack screws 354. Mid-level platform 350 is fixed so as to be integral with the inside wall of a maintenance hangar facility. A stair 352 is provided for allowing aircraft maintenance personnel to walk from between mid-level platform 350 and a floor of the aircraft maintenance hangar.

Tail stand arrangement 344 further includes a number 2 engine stand 342, which is suspended from mid-level platform 350. Number 2 engine stand 342 is positioned for gaining access to the number 2 engine 347 of aircraft 15, which is a Boeing 727.

Figure 22:
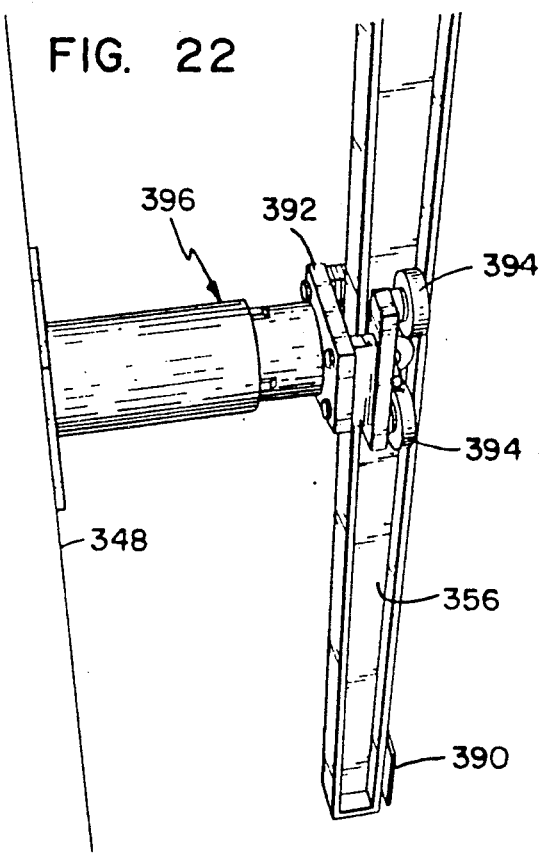
FIG. 22 is a perspective view of a third feature on the upper platform.
Figure 23:
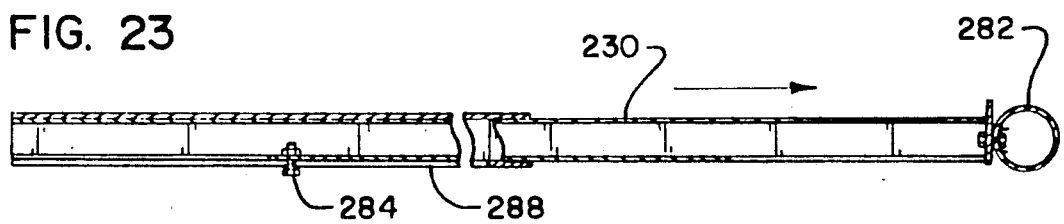
FIG. 23 is a cross-sectional view of one of the board assemblies according to the invention illustrated in FIGS. 1-22.

Referring to FIGS. 2 and 22, upper platform 348 is guided for linear movement with respect to the inner wall of an aircraft maintenance hangar or facility or a track member 356. Track member 356 is mounted so as to extend longitudinally vertically along an inner wall of the aircraft maintenance facility by a mounting plate 390. Upper platform 348 is mounted to a trolley bracket 392 via an axially adjustable connection 396, as is shown in FIG. 22. Trolley bracket 392 includes a plurality of trolley wheels 394 for engaging a track portion of track member 356. Through the stabilization provided by track member 356, upper platform 348 will remain horizontal and evenly spaced from the wall of the facility when raised or lowered by jack screws 354. As shown in FIG. 2, a stairway 358 is pivotally mounted to upper platform 348 with a lower end thereof resting upon mid-level platform 350. As a result, stair 358 provides access between upper platform 348 and mid-level platform 350 regardless of the vertical adjustment therebetween.

Figure 21:
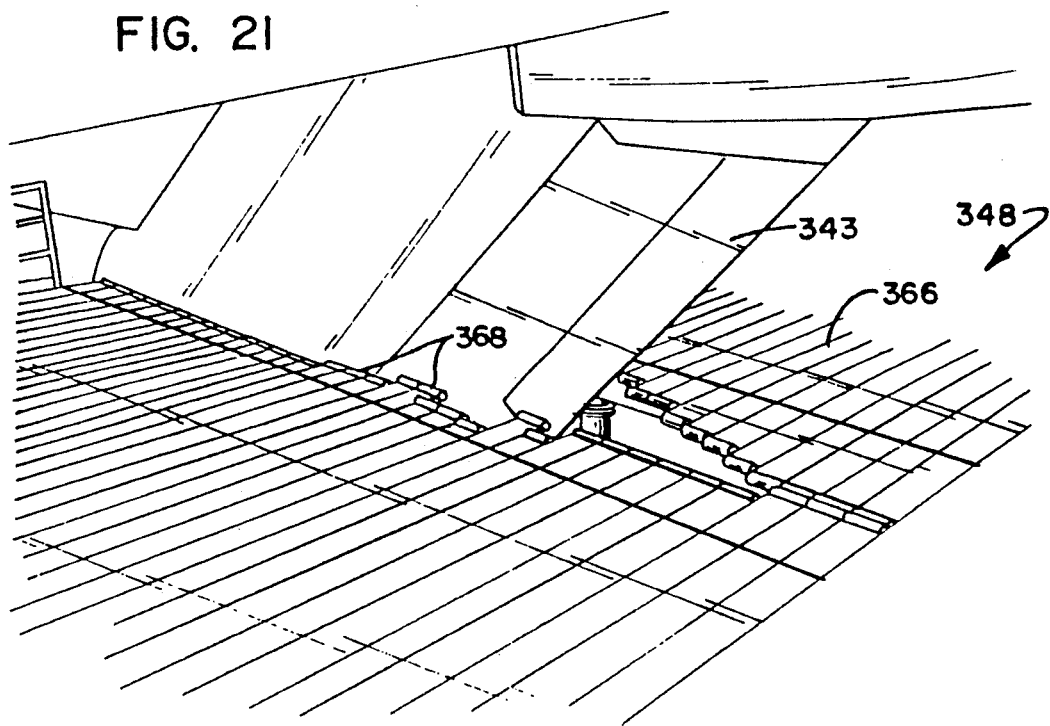
FIG. 21 is a perspective view of a second feature on the upper platform.

As shown in FIG. 21, upper platform 348 is provided with a plurality of slide boards 366 which are mounted within housings within upper platform 348 and are expandable to conform to the outer dimensions of tail section 343 during maintenance of aircraft 15. Each slide board 366 is provided with a bumper 368 on a distal end thereof. The construction of slide boards 366, bumpers 368 and the housings therefor are identical to those described above in reference to the slide boards on extendable nose engaging section 52.

Figure 20:
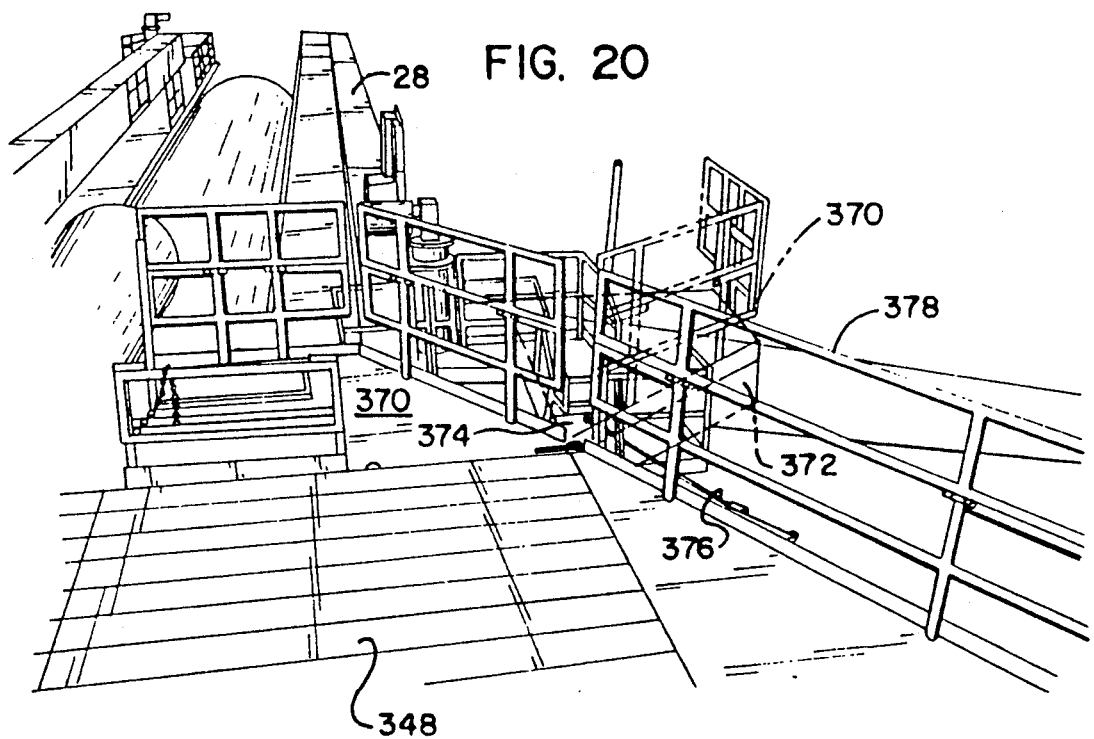
FIG. 20 is a perspective view of one portion of an upper tail access platform according to the system illustrated in FIGS. 1-19.

As shown in FIG. 20, upper level 348 is further provided with a deck section 370 which is pivotable away from the main portion of upper platform 348 to permit engines 345, 347, 349 to be accessed by a traversable overhead crane. In the preferred embodiment, swingable deck section 370 is pivotable through a bell crank arrangement 374 which is actuatable by a manual linkage 376, as is shown in FIG. 20. A support arm 372 is pivotally mounted to the remainder of upper platform 348 and supports deck section 370.

Another feature of upper platform 348 is the provision of the number of the height adjustable guard rails 378, which have a lower rail section 382 and an upper rail section 380. Upper rail section 380 is arranged to pivot downwardly about a hinge 384, as is shown in FIG. 25. A first arcuate stop member 386 on upper rail section 380 and a second arcuate stop member 388 on lower rail section 382 are provided to stabilize upper rail section 380 when it is locked in the upward position, as is shown in FIG. 20. Fold-over guard rails 370 increase the flexibility of system 10 for use when maintaining different types of aircraft.

Figure 18:
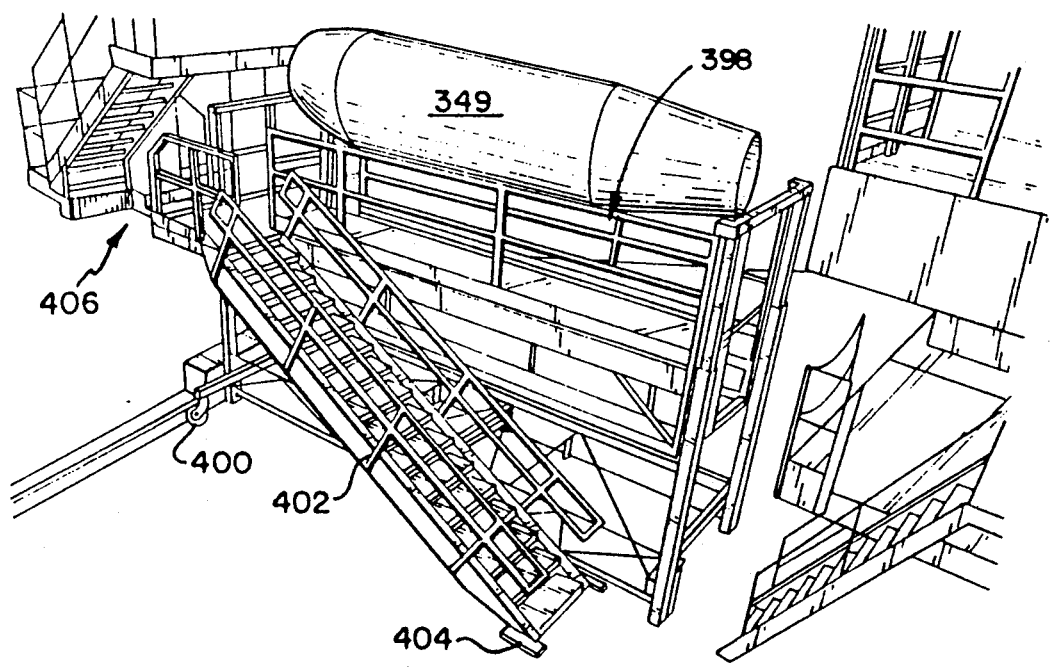
FIG. 18 is a top front perspective view of an engine access stand within the system illustrated in FIGS. 1-17.
Figure 19:
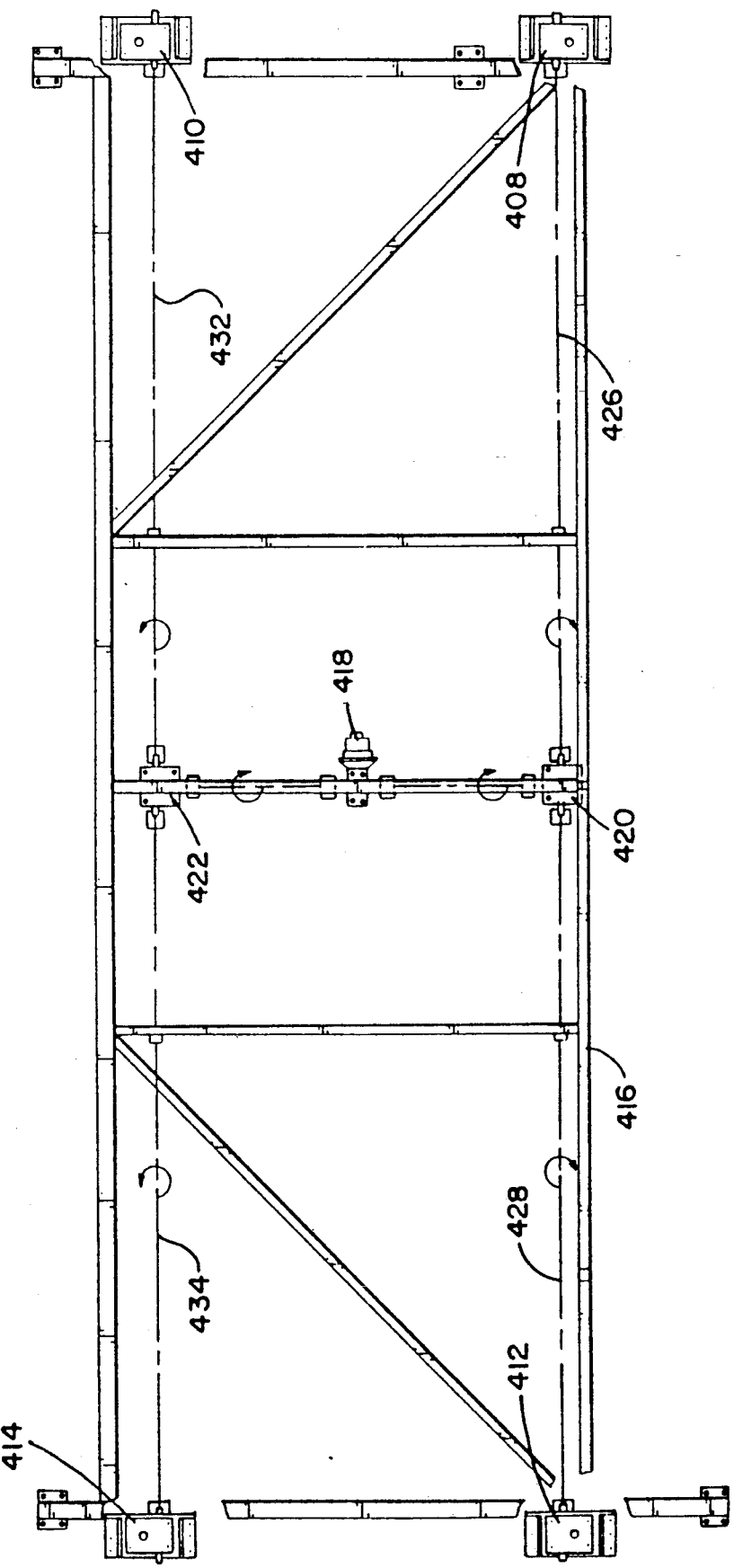
FIG. 19 is a schematic view of an H-drive assembly in the engine stand illustrated in FIG. 18.

A stand 346 for gaining access to the number 1 and number 3 engines of an aircraft is illustrated in FIGS. 2, 18 and 19 of the drawings. As may be seen in FIG. 18, engine stand 346 includes a work platform 398 which is vertically adjustable with respect to an engine 349 of aircraft 15. A stairway 402 is pivoted at its upper end to adjustable work platform 398, and is supported on the floor of the facility on a second, lower end by casters 404. Casters 400 are provided to support a frame 416 of the engine stand 346. To vertically adjust platform 398 relative to the frame 416 of engine stand 346, as well as with respect to engine 349, an electric motor 418 is connected to a first shaft 424, as is shown in FIG. 19. First shaft 424 is connected to a second shaft 426 and a third shaft 428 via a transfer case 420. Second shaft 426 is connected to a first jack screw 408, and third shaft 428 is connected to a third jack screw 412. Motor 418 is a second end of first shaft 424, is connected to a fourth shaft 432 and a fifth shaft 434 through a transfer case 422. Fourth shaft 432 is connected to drive a second jack screw 410 and fifth shaft 434 is connected to drive a fourth jack screw 414. When an operator actuates motor 18, the above-described "H-drive" transmission will ensure that the four jack screws 408, 412, 410, 414 will simultaneously turn at an identical speed. As a result, work platform 398 remains completely horizontal during vertical adjustment.

The jack screws 354 for vertically adjusting upper platform 348 with respect to mid-level platform 350 are controlled through a transmission that is identical in all relevant respects to that described above with reference engine stand 346.

Figure 26E:
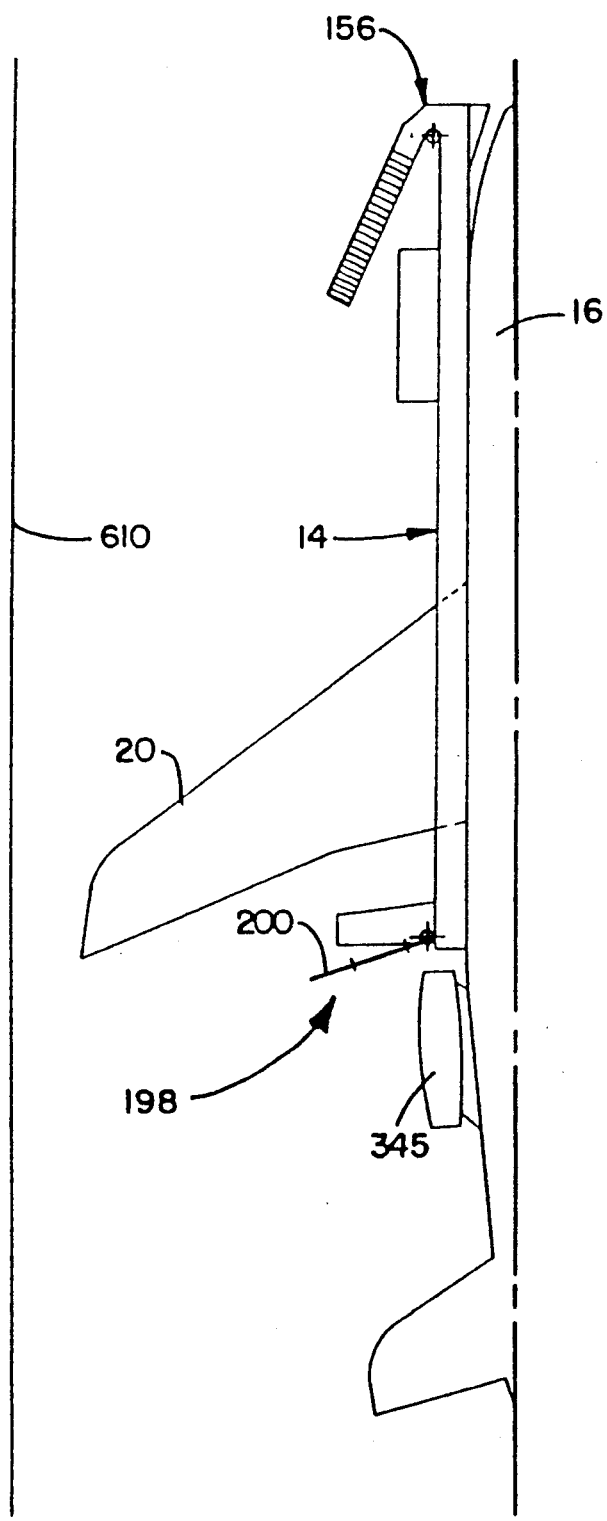

With reference to FIGS. 26(a)-26(e), the deployment and operation of a system 10 according to the invention will now be described. Referring first to FIG. 26(a), the second fuselage dock assembly 14 is initially positioned with its rearward end spaced outwardly along first rail 200 from the fuselage 16 of an aircraft 15 as aircraft 15 is backed into a maintenance hangar. The forward end of second fuselage dock assembly 14 is at this time positioned radially outwardly from fuselage 16 to the extent necessary to clear the left wing 20 of the aircraft as it is backed into the hangar. Rear trolley assembly 198 on the rearward end of assembly 14 must be spaced far enough outwardly from fuselage 16 so as to clear the tail section and the number one engine 345 of the aircraft 15. At this time, the first fuselage dock assembly 12 is symmetrically positioned on the opposite side of the aircraft.

Once the aircraft 15 is backed far enough into the maintenance hangar so as to assume the position with respect to tail stand arrangement 344 which is illustrated in FIG. 2, the fuselage dock assemblies 12, 14 are deployed into operative position adjacent fuselage 16. To accomplish this, pneumatic cylinder 168 and forward trolley assembly 156 is retracted, thereby lifting small wheels 162 so that forward trolley assembly 156 rests upon the first and second large wheels 158, 160. Power is then supplied to motor 186 to drive the second large wheels 160. Since first large wheel 158 is slightly inclined with respect to second large wheel 160, so forward trolley assembly 156 negotiates a radially curved path. As a result, the forward end of second fuselage dock assembly 14 negotiates a curved path to the position which is illustrated in FIG. 26(b), while the rearward end thereof stays relatively stationary. Pneumatic cylinder 168 is then extended, to re-deploy the small wheels 162 on forward trolley assembly 156. At this point, motor 214 and rear trolley assembly 198 is actuated to move the rearward end of second fuselage dock assembly 14 to the position which is illustrated in FIG. 26(c). During such movement, the forward trolley assembly 156 slides longitudinally forward on small wheels 162. Pneumatic cylinder 168 is then again retracted, and motor 186 is actuated to move the forward end of fuselage dock assembly 14 to the position illustrated in FIG. 26(d), immediately adjacent the outer surface of fuselage 16. The rear end of assembly 14 is then moved by rear trolley assembly 198 to its final inward position adjacent fuselage 16, as shown in FIG. 26(e).

Simultaneously or sequentially, the first fuselage dock assembly 12 may be simultaneously deployed on the opposite side of fuselage 16.

Once fuselage dock assemblies 12, 14 are in position, normal maintenance may be performed on the aircraft 15. Adjustable work platform 64 may be raised or lowered to gain access to a desired port or entryway on aircraft 15. Upper tail platform 348 may likewise be raised or lowered to correspond to the outer dimensions of the vertical tail section 343 of aircraft 15. The Number 1 and 3 engine stands 346 may likewise be adjusted vertically to service the Number 1 and 3 engines 345, 349 on the opposite sides of aircraft 15. The height and elevation of walkway section 28 may be adjusted to correspond to the elevation and inclination of fuselage 16. It should be noted that the entire assembly could be lowered to gain access to the landing gear of the aircraft as well.

While the fuselage dock assemblies 12, 14 are deployed next to fuselage 16, the nose-engaging sections 52 may be extended or retracted to correspond to the length of aircraft 15. To adjust the degree of extension of section 52, lever 264 is moved to the downward position, thereby releasing brake pad 262 from the lower surface of I-beam track 250. The entire assembly 52 is then manually pushed or pulled to the selected position, upon which time lever 264 is again moved to its upward position, as shown in FIG. 12.

Once the desired maintenance has been performed on aircraft 15, fuselage dock assemblies 12, 14 are withdrawn from their operative position with respect to fuselage 16, by repeating, in reverse, the incremental movements which have previously been discussed with reference to FIGS. 26(a)-26(e).

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A fuselage dock assembly for use during maintenance and repair of an aircraft of the type which has an elongated fuselage and a pair of wings, comprising:
   a first ground-supported column,
   a second ground-supported column,
   a walkway system which is adapted to extend along the length of the fuselage for providing convenient access to the fuselage, said walkway system being supported at a first location by said first column and at a second location by said second column; and
   means for adjusting the height and inclination of said walkway section relative to a horizontal plane, said adjusting means being capable of elevating said walkway system over the wings of the aircraft during deployment of said dock system next to the aircraft, walkway said walkway section can be positioned next to the fuselage and inclined conform to the natural inclination of a particular aircraft.

2. An assembly according to claim 1, wherein said adjusting means comprises first and second means for extending and retracting said first and second columns, respectively.

3. An assembly according to claim 2, wherein each of said extending and retracting means comprises a jack screw-type arrangement.

4. An assembly according to claim 1, wherein said walkway section includes a floorway and a plurality of handrail members, said handrail members being selectively removable to provide access to different types of aircraft.

5. An assembly according to claim 1, wherein at least one of said columns is comprised of at least two telescoping members, and further comprising means to keep said telescoping members rotationally aligned during movement.

6. An assembly according to claim 1, wherein said walkway section includes at least one adjustable deck platform that is height adjustable to conform to door and port configuration s for different aircraft.

7. An assembly according to claim 1, wherein said walkway section includes an extendable nose-engaging portion which can be used to service the forward end of different types of aircraft.

8. An assembly according to claim 1, wherein said walkway portion includes a resilient gasket member along an inside edge thereof to protect the outer surface of an aircraft when docked.

9. An assembly according to claim 1, wherein said walkway section includes shelving for storing parts and equipment used during aircraft maintenance.

10. An assembly according to claim 1, wherein said walkway section includes an electrical distribution system with outlets.

11. An assembly according to claim 1, wherein said walkway includes means for torsionally reinforcing said walkway section against stress created by components of said walkway section, workers and equipment which are proximate an aircraft.

12. An assembly according to claim 11, wherein said torsional reinforcing means comprises a longitudinally extending box-like beam which is integral with said walkway section along its length.

13. An assembly according to claim 1, wherein said first and second columns are supported by trolley assemblies.

14. An assembly according to claim 13, wherein said first column is adapted for positioning toward the forward end of an aircraft and is supported by a first trolley, said first trolley having a first set of wheels oriented substantially perpendicular to a longitudinal axis of said walkway section.

15. An assembly according to claim 14, wherein said first trolley further comprises a second set of wheels which are oriented in a direction which is substantially parallel to the longitudinal axis of said walkway section; and means for switching said first trolley between said first set of wheels and said second set of wheels.

16. An assembly according to claim 15, wherein said switching means comprises means for lowering said second set of wheels beneath said first set of wheels.

17. An assembly according to claim 14, wherein said second trolley comprises a set of wheels which are adapted to ride upon rails set into an underlying surface.

* * * * *

UNITED STATES PATENT AND TRADEMARK OFFICE
CERTIFICATE OF CORRECTION

PATENT NO. : 5,152,370

DATED : October 6, 1992

INVENTOR(S) : Silberman

It is certified that error appears in the above-identified patent and that said Letters Patent is hereby corrected as shown below:

Column 14, claim 1, line 46, delete "walkway" (first occurrence) and insert -- whereby --.

Signed and Sealed this

Eighth Day of March, 1994

Attest:

BRUCE LEHMAN

Attesting Officer

Commissioner of Patents and Trademarks